US008082170B2

(12) United States Patent
Cereghini et al.

(10) Patent No.: US 8,082,170 B2
(45) Date of Patent: Dec. 20, 2011

(54) OPPORTUNITY MATRIX FOR USE WITH METHODS AND SYSTEMS FOR DETERMINING OPTIMAL PRICING OF RETAIL PRODUCTS

(75) Inventors: Paul M. Cereghini, San Diego, CA (US); Judy Bayer, London (GB); Enrico Galimberti, Milan (IT); Thomas Ryan, Valley Center, CA (US)

(73) Assignee: Teradata US, Inc., Dayton, OH (US)

( * ) Notice: Subject to any disclaimer, the term of this patent is extended or adjusted under 35 U.S.C. 154(b) by 932 days.

(21) Appl. No.: 11/755,052

(22) Filed: May 30, 2007

(65) Prior Publication Data

US 2008/0235076 A1   Sep. 25, 2008

Related U.S. Application Data

(60) Provisional application No. 60/810,192, filed on Jun. 1, 2006, provisional application No. 60/810,193, filed on Jun. 1, 2006.

(51) Int. Cl.
*G06Q 10/00* (2006.01)
*G06Q 30/00* (2006.01)

(52) U.S. Cl. .................................................. 705/7.31

(58) Field of Classification Search .............. 705/7, 7.31
See application file for complete search history.

(56) References Cited

U.S. PATENT DOCUMENTS

| 6,308,162 | B1 | 10/2001 | Ouimet et al. |
| 7,197,474 | B1 | 3/2007 | Kitts |
| 2002/0019763 | A1 | 2/2002 | Linden et al. |
| 2004/0249696 | A1* | 12/2004 | Mathews et al. ............... 705/10 |
| 2005/0096963 | A1 | 5/2005 | Myr et al. |
| 2005/0142573 | A1* | 6/2005 | Glinskii ............................ 435/6 |
| 2009/0210355 | A1 | 8/2009 | Dagum et al. |

OTHER PUBLICATIONS

"Elasticity" web article archived on Dec. 18, 2005, retrieved on Aug. 13, 2011; http://web.archive.org/web/20051218021854/http://www.ses.wsu.edu/people/faculty/rosenman/dist301/elast.htm.*
E-Commerce Recommendation Applications, J. Ben Schafer, Joseph A. Konstan, John Riedl. Data Mining and Knowledge Discovery. Boston: Jan. 2001. vol. 5, Iss. 1-2; p. 115.
"http://web.arch ive.org/web/20051218021854/http://www.ses.wsu.ed u/people/facu lty/rosen man/d ist301 /elast.htm", retrieved Jun. 2, 2010.

* cited by examiner

*Primary Examiner* — John Hayes
*Assistant Examiner* — Allen Jung
(74) *Attorney, Agent, or Firm* — James Stover

(57) ABSTRACT

A data warehouse system and application which analyzes historical sales and product data contained within a data warehouse to determine the best product prices across a set of products for a retailer. The application analyzes historical sales and product data contained in a database to determine an opportunity score for multiple products sold by a retailer, the opportunity score indicating potential benefit to said business from changing the pricing of a product; and analyzes historical sales data contained in the database to determine an ability to change score for each product, the ability to change score indicating potential risk of lost sales for the retailer from changing the pricing of a product. Results of the analyses are displayed in a scatter plot graph with the graph axes being the opportunity scores and ability to change scores, respectively. Each product is represented by a point in the scatter plot, the coordinates of the point being the opportunity score and the ability to change score associated with the represented product. The scatter plot graph can be divided into quadrants, wherein products having favorable opportunity scores and favorable ability to change scores are displayed together in one the four quadrants.

6 Claims, 36 Drawing Sheets

FIG. 11

○ Execute On Demand       ● Schedule

Start Date: [16/June/2004]

Time: [12:00 AM ▽]

Recurrence Interval: [None ▽]

Repeat Count: [-1]  (-1 equals an inf

End Date: [         ]

|  | « | | June 2004 | | | » | ☒ |
|---|---|---|---|---|---|---|---|
| S | M | T | W | T | F | S | |
| 6 | 7 | 1 | 2 | 3 | 4 | 5 | |
| 13 | 14 | 8 | 9 | 10 | 11 | 12 | |
| 20 | 21 | 15 | 16 | 17 | 18 | 19 | |
| 27 | 28 | 22 | 23 | 24 | 25 | 26 | |
| | | 29 | 30 | | | | |

FIG. 24

OPPORTUNITY MATRIX FOR USE WITH METHODS AND SYSTEMS FOR DETERMINING OPTIMAL PRICING OF RETAIL PRODUCTS

CROSS REFERENCE TO RELATED APPLICATIONS

This application claims priority under 35 U.S.C. §119(e) to the following commonly-assigned patent applications, which are incorporated herein by reference:

Provisional Application Ser. No. 60/810,192, entitled "METHODS AND SYSTEMS FOR DETERMINING OPTIMAL PRICING FOR RETAIL PRODUCTS," filed on Jun. 1, 2006; and Provisional Application Ser. No. 60/810,193, entitled "OPPORTUNITY MATRIX FOR USE WITH METHODS AND SYSTEMS FOR DETERMINING OPTIMAL PRICING OF RETAIL PRODUCTS," filed on Jun. 1, 2006.

FIELD OF THE INVENTION

The present invention relates to methods and systems for performing price optimization analysis for retail products, and in particular, a data warehouse application for determining the best product prices across a set of products for a retailer.

BACKGROUND OF THE INVENTION

The capability to accurately price products improves a retail organization's ability to maximize profit, limit unprofitable product substitution, and take advantage of potential cross-sell opportunities is a desirable objective for a retail organization. Thus, business tools that provide a retailer with the capability to accurately and reliably price products on a routine basis, and automatically adjust pricing in response to new information, whether that information is internal sales and promotion information or external competition information are greatly desired.

Teradata, a division of NCR Corporation, has developed an analytical application, referred to as Teradata Price Optimizer (PO), which determines the best price across a set of a retailer's products. On-demand, it automatically creates statistical models, and without any user intervention, identifies and estimates product cross-sell and substitution effects. It does all modeling and analysis directly on the data in a Teradata data warehouse system, without any data extraction or manual data preparation. Output from the Teradata Price Optimizer analytic application can be used operationally, to set new product prices. Additionally, the Teradata Price Optimizer application serves as a decision support tool to help retailers understand the influencers on their product sales and profitability.

The application is designed to do the following:

Automatically create pricing models. Statistical models are automatically created using relevant information in the database. These models estimate price elasticity given the impact of price and other effects, such as promotions.

FIG. 5 provides a chart illustrating the effect of product price 505 changes on product sales volume 507 and profit 509. Graph 511 shows how sales volume increases linearly as product price decreases. Graph 513 illustrates how profit first increases, then decreases as product price decreases.

Using market basket data, automatically identify all product cross-sell and substitution effects and combine these in the analysis. There is no requirement for users to identify cross sell products or substitute products. The system does this by analyzing market basket data, taking into account product availability.

The chart shown in FIG. 6 illustrates the positive effect on profit 605 associated with products C through V that results from a decrease in the sales price of a related product B. Other products, not shown, will experience a decrease in sales and profit as the price of product B decreases.

Combine a product's elasticity with cross sell and cannibalization effects to understand how these other factors influence the decision to change product prices.

Results of a products' price elasticity, plus all cross-sell and cannibalization effects resulting from changes in the products' price are illustrated in the chart shown in FIG. 7. Graph 707 shows profit increasing as price decreases, based on the price elasticity of Product C. Graph 709 shows profits increasing, then decreasing, taking into consideration the elasticity of Product C, plus all cross-sell and cannibalization effects.

Optimize product prices across products, taking into consideration cross-sell and substitution effects as well as a products' own elasticity.

Results of a products' price elasticity, plus all cross-sell and cannibalization effects resulting from changes in the products' price are illustrated in the chart shown in FIG. 8. The chart illustrated in FIG. 8 shows cross-sell and cannibalization effects at each percentage change for exemplary Product D. The bars in the center of the graph, identified by reference numeral 807, show how profit generally increases as the price of Product D decreases. To the right of the graph, bars 809 and 811, located above bars 807, illustrate profit increases associated with cross-sell products. Also to the right of the graph, but below the 0 (zero) profit line, bars 813 through 819, illustrate the negative profit effects due to cannibalization products.

Perform pricing analyses separately for each store within a retailer organization. Pricing can be performed for a user-defined group of stores, or all stores.

Perform pricing analyses at the lowest level of a product hierarchy. Individual analysis can be performed for each product.

Allow users to perform a 'what if' analysis to determine the impact of pricing a product differently than what is recommended. The 'what if' analysis also takes into consideration cross sell and substitution effects. There is often a business consideration that will override a price change, the system allows this, but also provides the user with the information to understand the business impact of this decision.

Recommend to users the products that represent the best opportunities and lowest risk for making pricing changes. Assessment of opportunity and risk is based on business factors relevant to the companies business. Weights on each factor are set by the user and can be adjusted to automatically understand the impact of business assumptions on product pricing opportunity and risk.

FIG. 9 illustrates the opportunity matrix chart 901 showing a plot of opportunity scores 903 vs. ability to change scores 905 for numerous products represented by points displayed in the chart. The chart is divided into four quadrants, where the most desirable products to perform elasticity are displayed in the upper right quadrant.

Create new pricing models on-demand. This is done by the retailer, with a few mouse clicks and input.

BRIEF DESCRIPTION OF THE DRAWINGS

FIG. 11 shows an example of a scheduling facility used to create an Opportunity Matrix result set.

FIG. 24 shows the Item Cross Sell tabular reporting screen.

DETAILED DESCRIPTION OF THE INVENTION

In the following description, reference is made to the accompanying drawings that form a part hereof and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Figure 1:
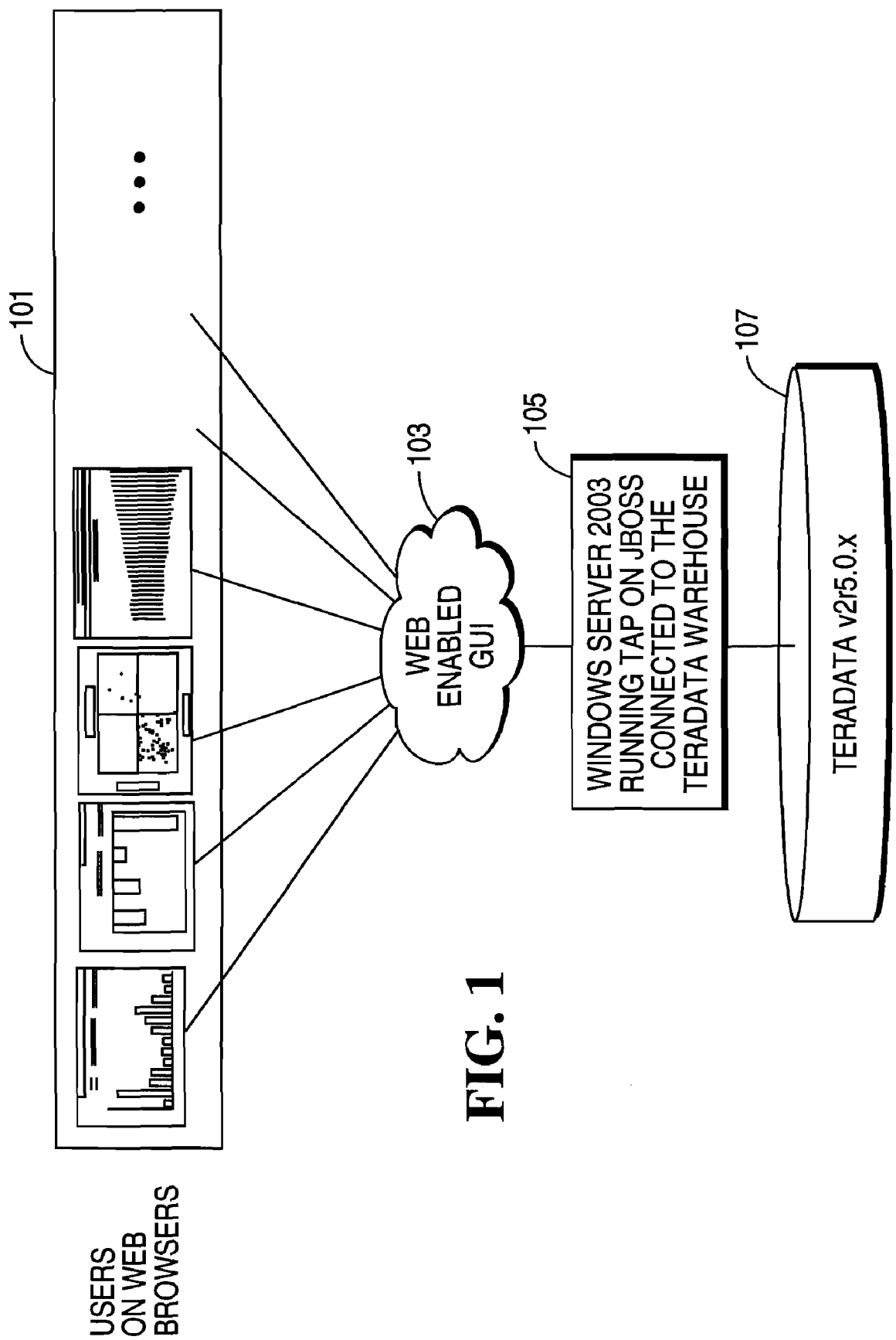
FIG. 1 provides a high level architecture diagram of the Teradata Price Optimizer application three-tier architecture.

In the embodiment described herein, the Price Optimizer application is implemented within a three-tier architecture, such as the one shown in FIG. 1. The three tiers include a presentation tier comprising a graphical user interface (GUI) 103 and Web Browser 101 operating on a client system; a middle tier comprising a JBoss Server 105; and database tier comprising a data warehouse 107, such as a Teradata Relational Database Management System (RDBMS) by NCR Corporation.

A user accesses the PO application through graphical user interface (GUI) 103 and Web Browser 101 operating on the client system. Initial login will authenticate the user to access the application which will be running on the JBoss Server 105. The JBoss application enables web access to the PO application and also supports access to the back-end Teradata RDBMS 107. The JBoss application provides high performance connectivity mechanisms such as connection pooling and cursor support through a Teradata JDBC driver.

Figure 2:
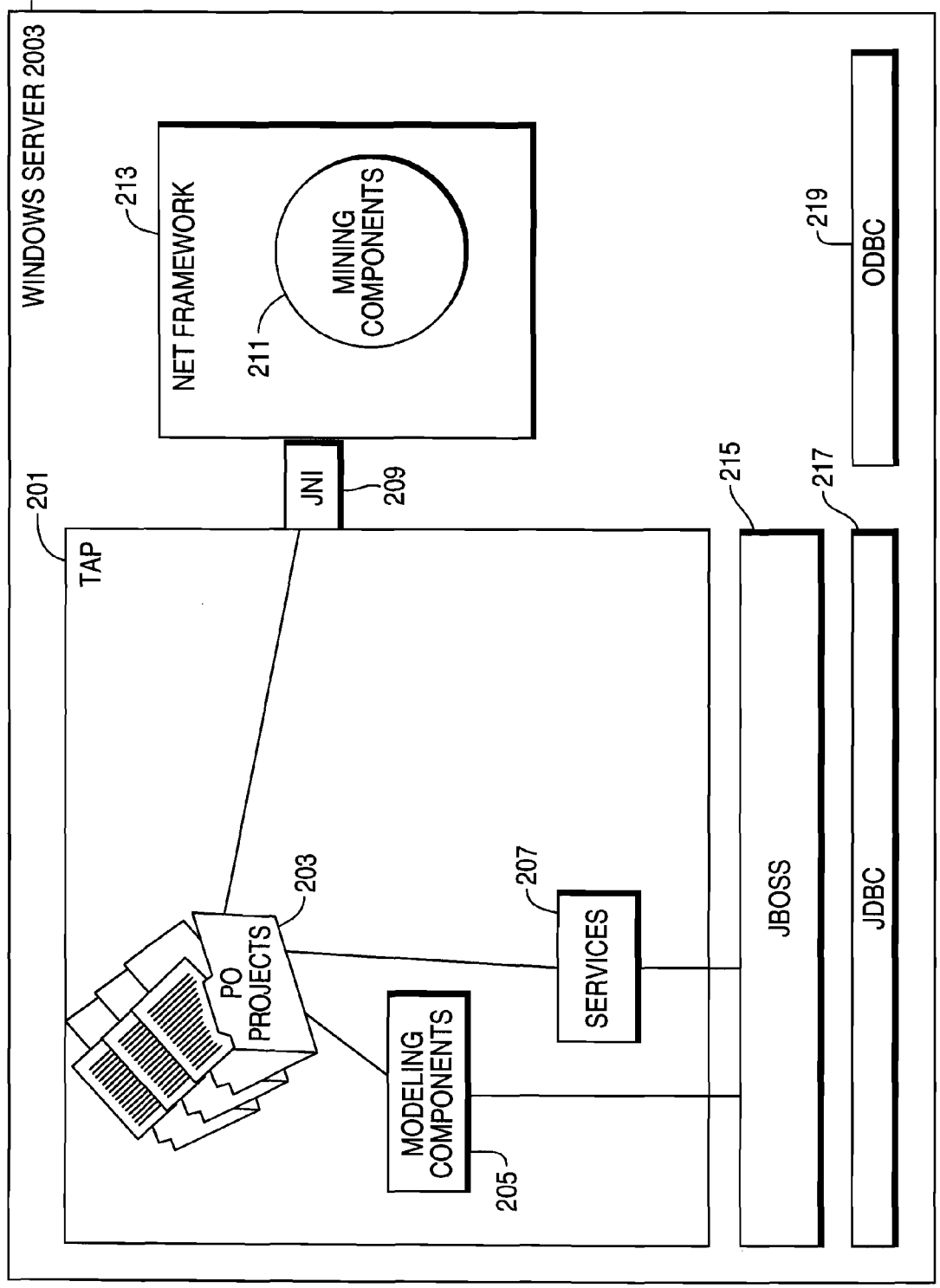
FIG. 2 provides additional detail concerning the middle tier server illustrated in FIG. 1.

This architecture emphasizes three strengths:
Flexible multi-user framework supported by the web
Separation of application logic and data access
Ability to leverage highly specialized SW across platforms FIG. 2 provides additional detail concerning middle tier server 103. The Price Optimizer (PO) application implements a set of analytic modules that are held together via logic in components that are called and persisted together with an object that acts as a "project". The project object allows the user to direct the analysis at specific subsets of the customer data, e.g., a specific catalogue. The project also allows the user to save the work done so that it will be available for subsequent retrieval.

The PO application is developed using the Teradata Application Platform (TAP) development framework, a product of NCR Corporation. In brief a TAP application is an "autonomous application unit" comprised of TAP Components, along with additional files needed to deploy that application on TAP. This would include JSP pages, images, custom tag libraries, navigation definition, configuration definition, and message bundle. A TAP Application contains business logic and user interfaces to interact with the end user. It is what the user sees when they logon to TAP. It is the result of assembling all of these pieces into a deployable unit. Referring to FIG. 2 the TAP application unit is identified by reference numeral 201, and includes a PO Projects object 203, TAP modeling components 203 and TAP services object 207.

The PO application functional requirements specify the need for a data mining functionality 211 that will be delivered to this application by modules from Teradata Warehouse Miner, a product of NCR Corporation, wrapped in Java interfaces and accessed through a Java Native Interface 209. FIG. 2 also illustrates how the application leverages the Windows-.Net Framework 213 to access these modules from Teradata Warehouse Miner and allows the modules to access the database directly through ODBC 219, while the JBoss layer 215 accesses the Teradata DBMS through JDBC 2217. It is worth noting that if a user should choose to run the Java Application Server (JBoss) on a different platform, such as Linux, they could potentially still access the data mining modules in a distributed environment running on a different Windows server.

In order to provide an effective price optimization analysis, the application requires products with a relevant number of historical data points (transactions), as well as price fluctuations. It is an ideal application to implement with a Teradata data warehouse system, given the level of detail that is required of the data that is consumed.

Figure 3:
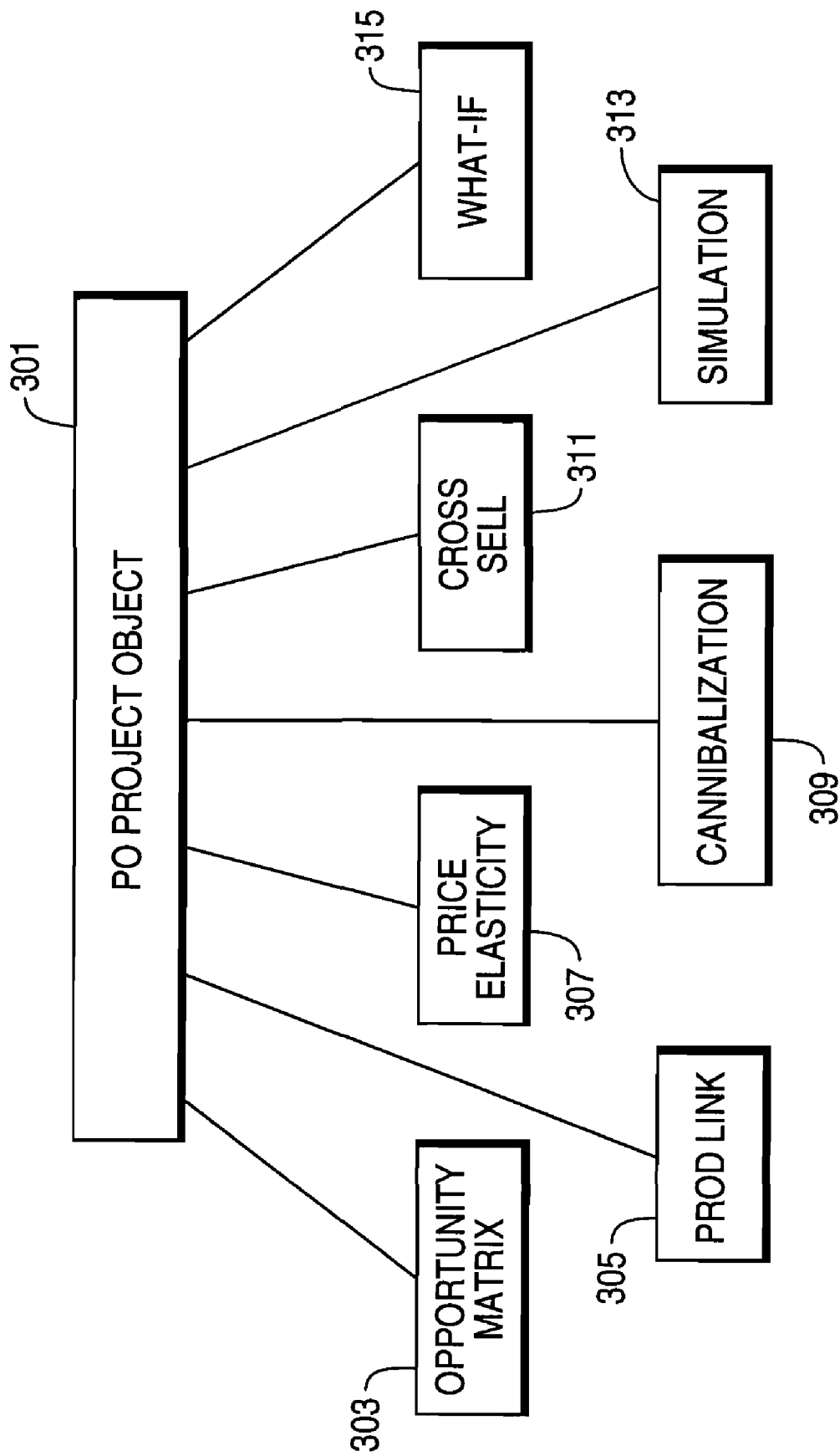
FIG. 3 provides a basic diagram of an object model for the price optimizater application identifying the eight major modules contained within the PO application.

FIG. 3 provides a diagram of an object model for the price optimization application. The main object in the PO application is the project object 301. The project is the metaphor for an inclusive unit of PO analysis which includes or is related to all other objects in the system. This is the main object that will be persisted from session to session of the application.

Project object 301 is linked to the application modules: Opportunity Matrix module 303, Product Link module 305, Price Elasticity module 207, Cannibalization module 309, Cross-Sell module 311, Simulation module 313 and What-if module 315. These are all be TAP managed objects that will be persisted in the database through the use of an O/R mapping and Hibernate. A benefit of having the objects as TAP Managed Objects is that these objects can be managed by the users and by the application through folders. This is especially beneficial for the project object. The objects can be manipulated through business logic contained in Server-Side components and exposed through the GUI by Client-Side components.

The Price Optimization modules, briefly described below, provide the user with the necessary information to calculate the final price for a given product.

Opportunity Matrix (OM) Module 303—This module helps the user determine which products are potential targets for further analysis by the Price Optimization application. In order to provide an effective analysis, the application requires products with a relevant number of history data points (transactions), as well as price fluctuations.

Product Link (PL) Module 305—This module provides a user with the ability to link new products to existing products and to use the elasticity coefficient for that product. This function can also be used for older products where elasticity estimates could not be calculated.

Price Elasticity (PE) Module 307—Following selection of targeted products in the Opportunity Matrix, this module will perform an analysis of the selected products over a period of time, in order to calculate the optimal selling price.

Item Cannibalization (IC) Module 309—This module determines how a change to the price of a specific item negatively impacts the potential sales of other items sold by the retailer.

Item Cross Sell (ICE) Module 311—Opposed to cannibalization, this module can calculate how changes to the price of a specific item will lift the sales of other items sold by a retailer.

Item Simulation (IS) Module 313—This module combines the results of the previous modules into one comprehensive graph, illustrating the impact of price changes on a product and including cross-sell and cannibalization effects on related products.

What If Scenario (WIS) Module 315—This module provides a mechanism to compare the planned sell quantities and prices that were calculated outside the system, with the prices and quantities that were calculated by the Price Optimization application.

Figure 4A:
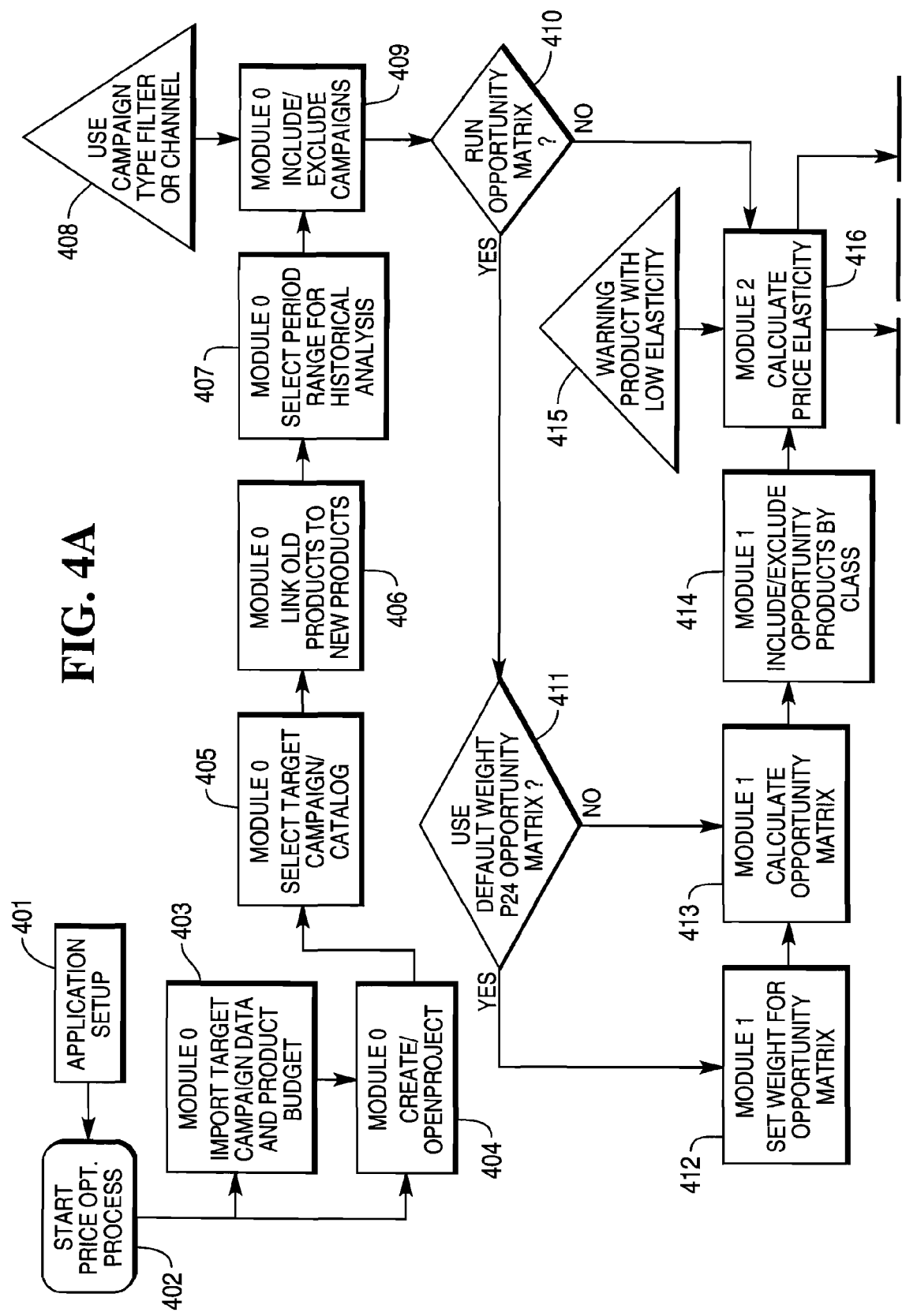
FIGS. 4A and 4B provide an application flow diagram of the price optimized application.
Figure 4B:
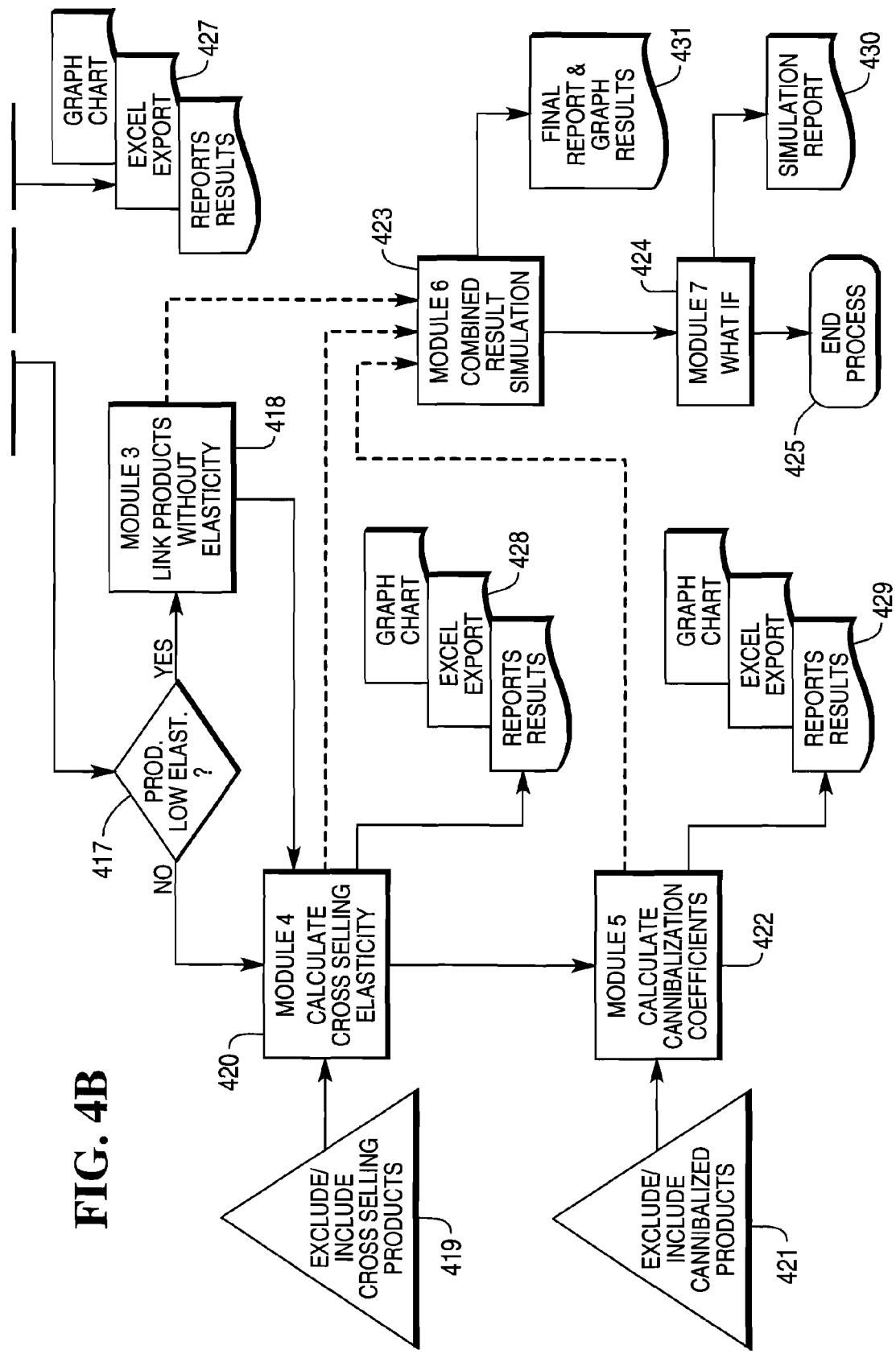
Figure 5:
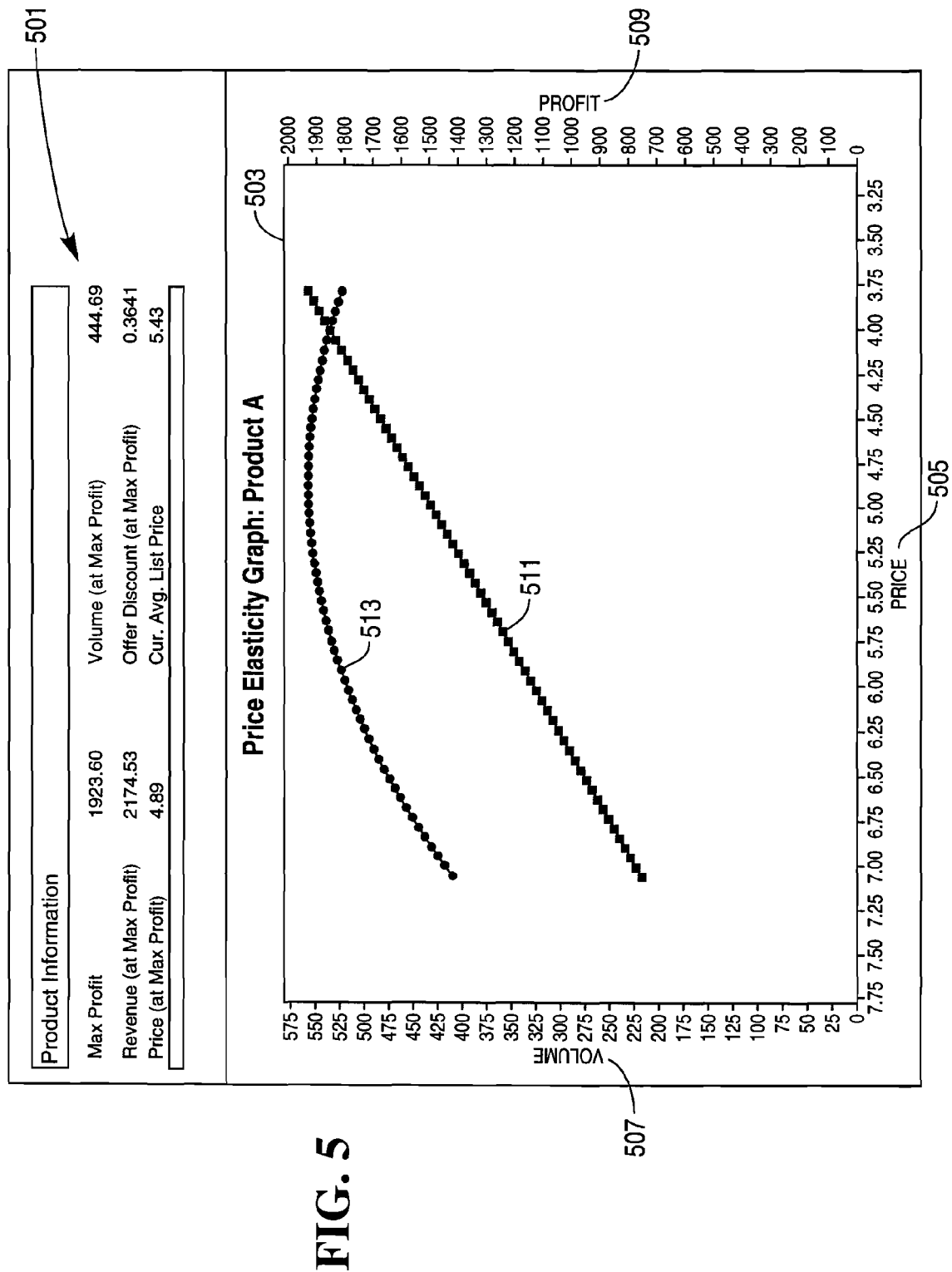
FIG. 5 provides a chart illustrating the effect of product price changes on product sales volume and profit.

These seven modules are utilized in the overall application logic shown in FIG. 4. Within the flow diagram, process steps identified by the title Module 0 and including steps 403 through 409, are associated with application setup and project selection and creation.

In step 401, an Application Parameters screen is provided to allow a user with administrative access to the application to set all application-level parameters. The value of these parameters will be passed to the project at the time of project creation.

These application parameters are described in Table 1 below:

TABLE 1

| Application Parameters | |
|---|---|
| Parameter Name | Parameter Description |
| Max Parallel Calculation | Default maximum number of parallel calculations |
| Number of extension days | Default number of extension days for the selected campaign range |
| Min number of observations | Opportunity Matrix and Price Elasticity: Default minimum number of observations for product |
| Last RFM period | Last RFM used Opportunity Matrix to find "Top" and "Good" customers. |
| Price range defaults | Price Elasticity: Price range defaults between. |
| Min PE Coefficient | Default minimum price elasticity coefficient to determine the validity of a products elasticity coefficient. |
| Max T-Score | Maximum T-Score used to discard the PE Coefficient |
| Max Cannibalization lift | Default max lift (1) |
| Min Cross Sell lift | Default min lift (1) |
| Max Cannibalization z-score | Default max significance (−3) |
| Min Cross Sell z-score | Default min significance (3) |
| Opportunity Matrix Default Weights | Initial settings for the factor weighting used by the Opportunity Matrix module |

In steps 402 and 403, a screen is provided for the user to specify opening a project. A project will represent a container for a price analysis session. Projects can be new or already existing. In the case that the user wants to open a new project, he/she will need to provide a project name and a description and link the project to target campaign and number of target orders (step 405).

Projects can be set to be read-only, after which no further analysis can be run to modify the project. When a project is opened, the user will have access to the seven PO modules, i.e., Opportunity Matrix module 303, Product Link module 305, Price Elasticity module 207, Cannibalization module 309, Cross-Sell module 311, Simulation module 313 and What-if module 315.

Once a project is created no analysis or action can take place before the user sets the project parameters. Project parameters include product hierarchy, catalogue hierarchy, data range for the analysis, a target campaign, a date range to find historical campaigns, the channel and the type of historical campaign to be considered.

In step 407, historical campaign selection is accomplished by selecting a campaign start date to identify a historical period.

Information about the type of a new target campaign is not available when a new campaign is created, so users are free to exclude or include all campaigns without any system constraints (step 409).

Process steps associated with Opportunity Matrix module 303, Price Elasticity module 307, Product Link module 305, Cannibalization module 309, Cross-Sell module 311, Simulation module 313 and What-if module 315 are identified by the titles Module 1 through Module 7, respectively. These portions of the application flow diagram will be described in greater detail in the sections that follow.

Opportunity Matrix

This module will implement two TAP components: a client-side component and a server-side component. The client-side component contains all the JSP's, flows, JavaScript and images that will make up the user interface. The server-side component includes a session bean that implements all the calculations that are required for population of the result set that will be rendered as charts of the analysis.

The scope of this analysis is to locate products with good business opportunity and, at the same time, with good price elasticity. The two dimensions of Opportunity Matrix define these concepts:

- Opportunity Score—a score that defines the opportunity for a business to benefit from optimizing prices on the basis of business requirements (revenue, quantity, number of orders, . . . ).
- Ability to Change Score—a score that defines the ability for business to optimize prices while minimizing risk of lost orders.

Figure 9:
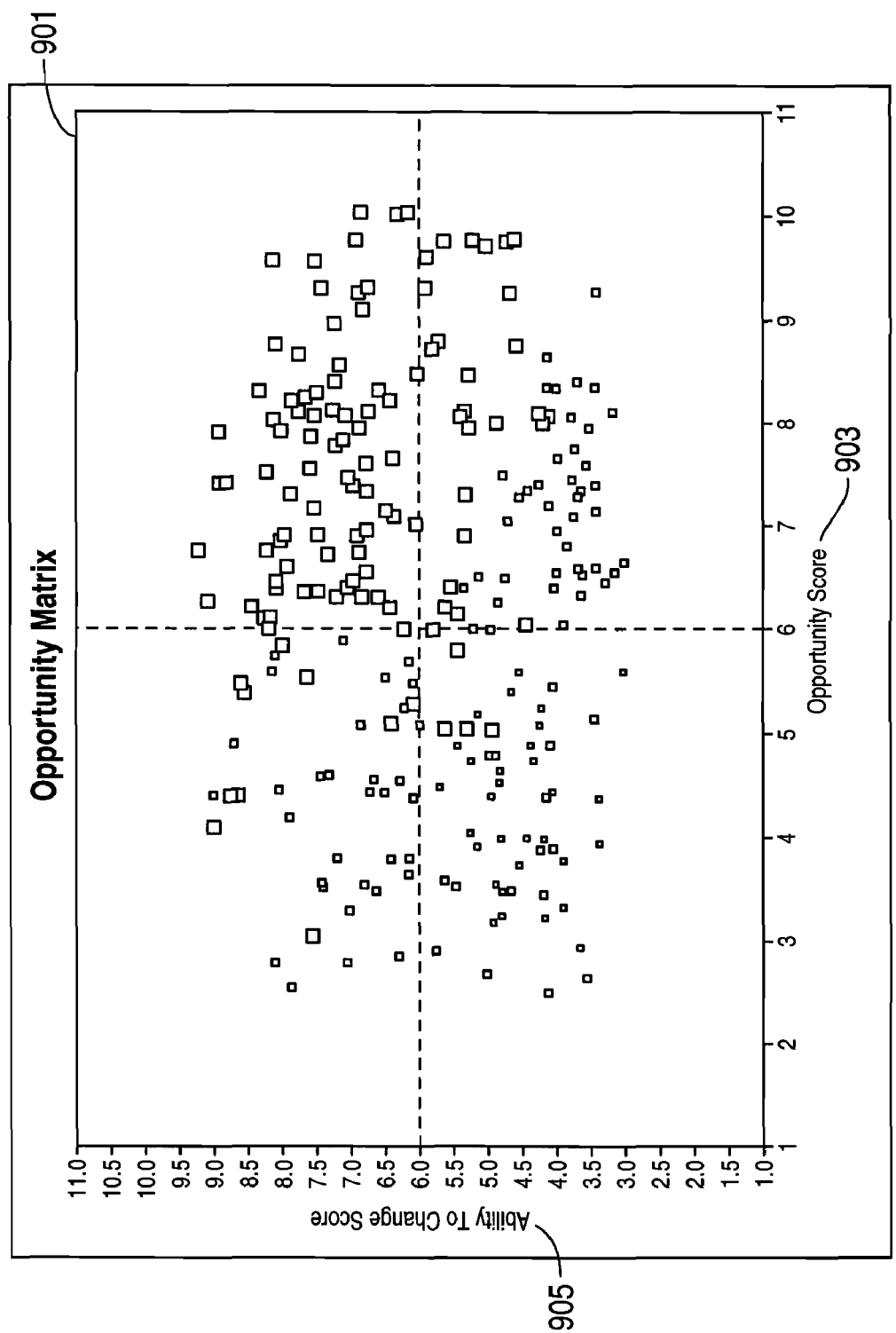
Figure 10:
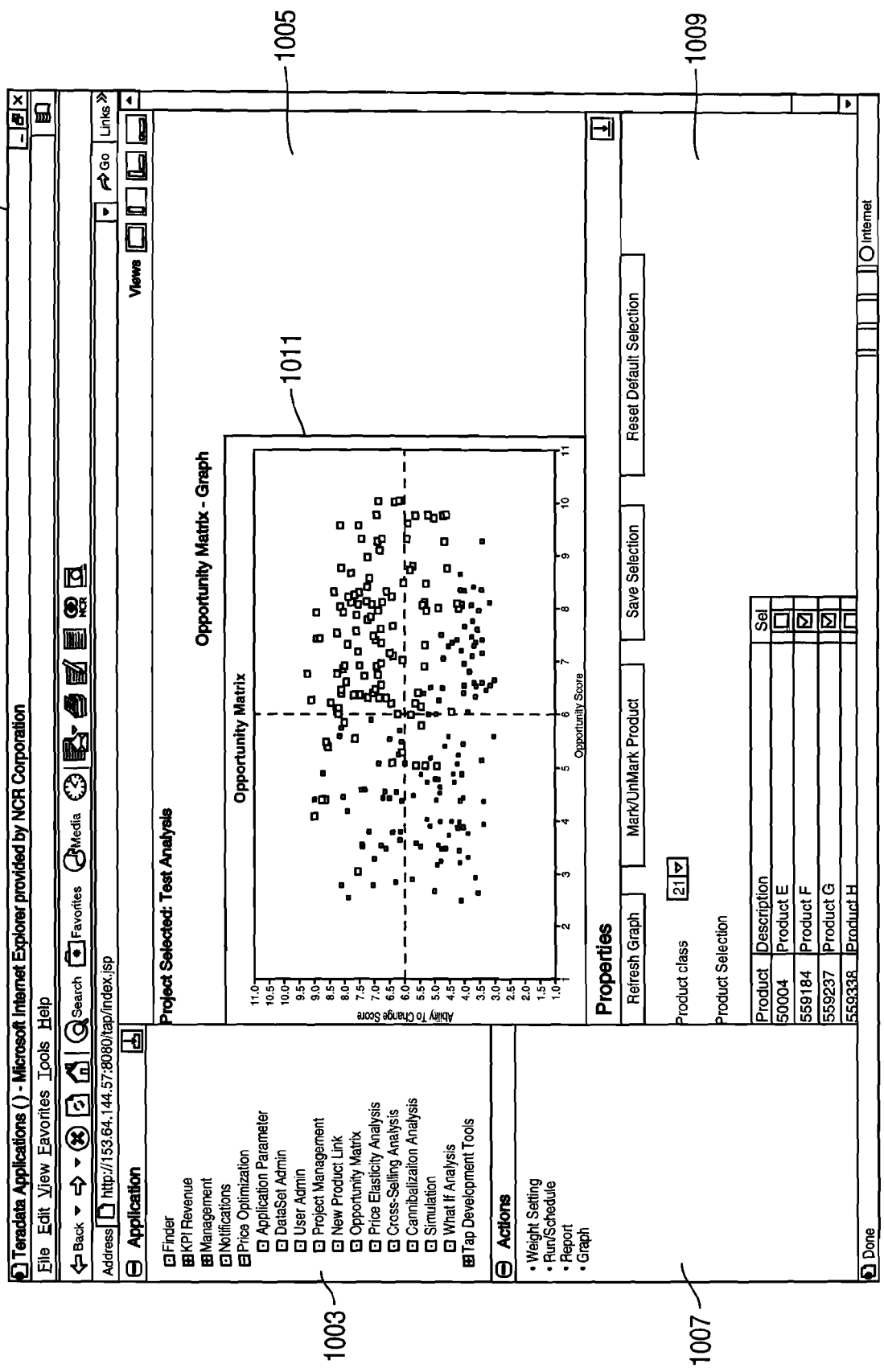
FIG. 10 illustrates a scatter plot rendering of an Opportunity Matrix.

FIG. 10 provides an example of the Opportunity Matrix chart 1011 displayed within the PO graphical user interface 1001. The TAP framework provides a standard GUI that is utilized by the PO application. This GUI has four areas: the application tree, the main workspace, the actions area, and the properties area. In FIG. 10, these four areas are identified by reference numerals 1003, 1005, 1007 and 1009, respectively. FIG. 9 provides an example of an opportunity matrix chart without the full graphical user interface.

Data Management

The analytical data set used to obtain the Opportunity Matrix is described in Table 2:

TABLE 2

Opportunity Matrix Analytical Data Set

| Information | Description |
| --- | --- |
| PRODUCT | Product Code |
| PRZ_LIST_UFF | Official list price |
| PRZ_LIST_CAMP | Campaign list price |
| PRZ_VEND | Selling price |
| PRZ_EFF | Effective price: selling price with additional discount due to spread of order discount |

TABLE 2-continued

Opportunity Matrix Analytical Data Set

| Information | Description |
| --- | --- |
| ORDERS | Number of orders |
| QTY | Quantity |
| PRD_MONX | Number of months in which a product was sold |
| CHERRY PICKERS | Number of Cherry Pickers purchased the product |
| GOLD | Number of Gold customers purchased the product |
| NORMAL | Number of Normal customers purchased the product |
| QTY CHERRY PICKERS | Product qty purchased by Cherry Pickers |
| QTY GOLD | Product qty purchased by Gold customers |
| QTY NORMAL | Product qty purchased by Normal customers |
| EFF_REV CHERRY PICKERS | Revenue (Effective amount) by Cherry Pickers |
| EFF_REV GOLD | Revenue (Effective amount) by Gold customers |
| EFF_REV NORMAL | Revenue (Effective amount) by Normal customers |
| TOP CUSTOMERS | Number of Top Customers purchased the product |
| GOOD CUSTOMERS | Number of Good Customers purchased the product |
| OTHERS CUSTOMER | Number of Other Customers purchased the product |
| QTY TOP CUSTOMERS | Product qty purchased by Top customers |
| QTY GOOD CUSTOMERS | Product qty purchased by Good customers |
| QTY OTHERS CUSTOMER | Product qty purchased by other customers |
| EFF_REV TOP CUSTOMERS | Revenue (Effective amount) by Top customers |
| EFF_REV GOOD CUSTOMERS | Revenue (Effective amount) by Good customers |
| EFF_REV OTHERS CUSTOMER | Revenue (Effective amount) by Other customers |

Opportunity Score

The factors considered to assign an Opportunity Score to products are listed below in Table 3:

TABLE 3

Opportunity Score Factors

| Factors | Description |
| --- | --- |
| Total Effective Revenue | Revenue based on Effective revenue |
| Total Discount Amount | (Official List Price * Product Quantity) − Total Effective Revenue |
| Total Discount Percentage | ((Official List Price * Product Quantity) − Total Effective Revenue)/(Official List Price * Product Quantity) |
| Product Quantity | Volume |
| Product Orders | Number of Orders |
| Total List Campaign Revenue | Revenue based on Campaign List Price |
| Total Sales Revenue | Revenue based on Selling Price |

Every factor has a weight assigned. Exemplary opportunity score factor weights are listed below in Table 4.

TABLE 4

Opportunity Score Factors Weights

| Factors | Weight |
|---|---|
| Total Effective Revenue | 0.40 |
| Total Discount Amount | 0.05 |
| Total Discount Percentage | 0.25 |
| Product Quantity | 0.05 |
| Product Orders | 0.20 |
| Total List Campaign Revenue | 0.05 |
| Total Retail Revenue | 0.00 |
| Total | 1.00 |

For every factor, a product is assigned to deciles (from 1 to 10, where 10 represents the highest value: for example if product x has the highest number of orders but no discount applied, it belongs to decile 10 for the factor Product Orders and to decile 1 for the factor Total Discount Amount).

The product Opportunity Score is equal to the sum of every factor multiplied for the corresponding decile. Opportunity Score values can vary from 1 to 10, where 10 represent the score of products with the most important business value.

Ability to Change Score

The factors considered to assign Ability to Change Score to products are shown below in Table 5.

TABLE 5

Ability to Change Score Factors

| Factors | Description |
|---|---|
| Number of Price Changes | |
| Top Customer Count Influence | Number of Top customers purchased the product |
| Good Customer Count Influence | Number of Good customers that purchased the product |
| Top Customer Qty Influence | Product qty purchased by Top customers |
| Good Customer Qty Influence | Product qty purchased by Good customers |
| Top Customer Effective Revenue Influence | Revenue (Effective amount) by Top customers |
| Good Customer Effective Revenue Influence | Revenue (Effective amount) by Good customers |
| Cherry Picker Customer Count Influence | Number of Cherry Pickers purchased the product |
| Cherry Picker Qty Influence | Product qty purchased by Cherry Pickers |
| Cherry Picker Effective Revenue Influence | Revenue (Effective amount) by Cherry Pickers |
| Gold Customer Influence | Number of Gold customers purchased the product |
| Gold Customer Qty Influence | Product qty purchased by Gold customers |
| Gold Customer Effective Revenue Influence | Revenue (Effective amount) by Gold customers |

Gold and Cherry Pickers customers are defined as follows:

Cherry pickers—those customers who have at least 2 type 2 or 3 orders in the last two years AND have paid less than 45% of official priceGold customer—those customers who have at least 2 type 2 or 3 orders in the last two years AND have paid 70% or more of official price Every factor has a weight assigned. Exemplary "Ability to Change Score factors" weights are listed in the Table 6.

TABLE 6

Ability to Change Score Factors Weights

| Factors | Weight |
|---|---|
| Number of Price Changes | 0.25 |
| Top Customer Count Influence | 0.30 |
| Good Customer Count Influence | 0.00 |
| Top Customer Qty Influence | 0.00 |
| Good Customer Qty Influence | 0.00 |
| Top Customer Effective Revenue Influence | 0.10 |
| Good Customer Effective Revenue Influence | 0.05 |
| Cherry Picker Customer Count Influence | 0.10 |
| Cherry Picker Qty Influence | 0.00 |
| Cherry Picker Effective Revenue Influence | 0.00 |
| Gold Customer Influence | 0.10 |
| Gold Customer Qty Influence | 0.00 |
| Gold Customer Effective Revenue Influence | 0.10 |
| Total | 1.00 |

For every factor a product is assigned to a decile (from 1 to 10, where 10 represents the highest value: for example if product x has many price changes and it is not purchased by Top customers, it belongs to decile 10 for Number of Price Changes factor and to decile 1 for Top Customer Qty Influence factor).

The product Ability to Change Score is equal to the sum of every factor multiplied for the corresponding decile. Score values can vary from 1 to 10, where 10 represents the score of products with the best ability for business to optimize prices while minimizing risk.

Process Logic

Referring to FIG. 4, the process logic associated with the Opportunity Matrix is shown by module 1 elements 410 through 414.

Based on the Campaign selected for the project, an opportunity matrix with the dimensions specified in the section above can be generated. This module can be accessed optionally. Referring to FIG. 10, a user can start analysis directly by selecting Price Elasticity from the application tree on the left side of the user interface framework.

The user will access a scheduling screen, illustrated in FIG. 11, which will allow her/him to create a result-set with the data required to render a scatter plot chart. Upon notification from the scheduled task, the user can then chose to render the scatter plot chart in a new workspace.

Referring again to FIG. 10, the opportunity matrix chart 1011 is a plot of opportunity score vs. ability to change, divided into four quadrants where the most desirable products to perform elasticity are in the upper right quadrant.

Upon generating the Opportunity Matrix the user can constraint the chart by selecting a subset (class) of the campaign instead of showing all stock keeping units (SKUs) in the campaign, and changing the color of the dots on the scatter plot chart by selecting specific SKUs in the charted group SKUs and redrawing the chart. A "Select All/Exclude All" button is available in each report to mass select and deselect products. The action will be applied only to the product of the selected class.

The dots in the upper right quadrant of the scatter plot chart are selected by the application as a default set of input SKUs for the Price Elasticity analysis module.

The module will make available the set of default weights that are used by the application to create the Opportunity Matrix, to allow the user to modify them. Once the weights are modified the chart will need to be redrawn to show the new location of the SKUs in the scatter plot. A user can immediately redo analysis with different weights on the factors, without recalculating the key factors. Modifying the weights will not change the color of the SKUs making the change in location more visible to the user.

If the user does a fly-over on the chart with the mouse icon on an item, the system will display the item id, description, opportunity score and ability to change score.

In the chart section, the user can select the products that will be used for the price optimization analysis. The user is able to select and deselect a product by clicking a box linked to a product highlighted by a quick pick function. This will further narrow/expand the set of SKUs that will be passed as input into the Price Elasticity module. As mentioned earlier, all the items that appear in the upper right hand quadrant are selected by default. The items displayed on the upper right quadrant will be displayed in a different color to the other items displayed in the chart the first time the chart is rendered.

Figure 12:
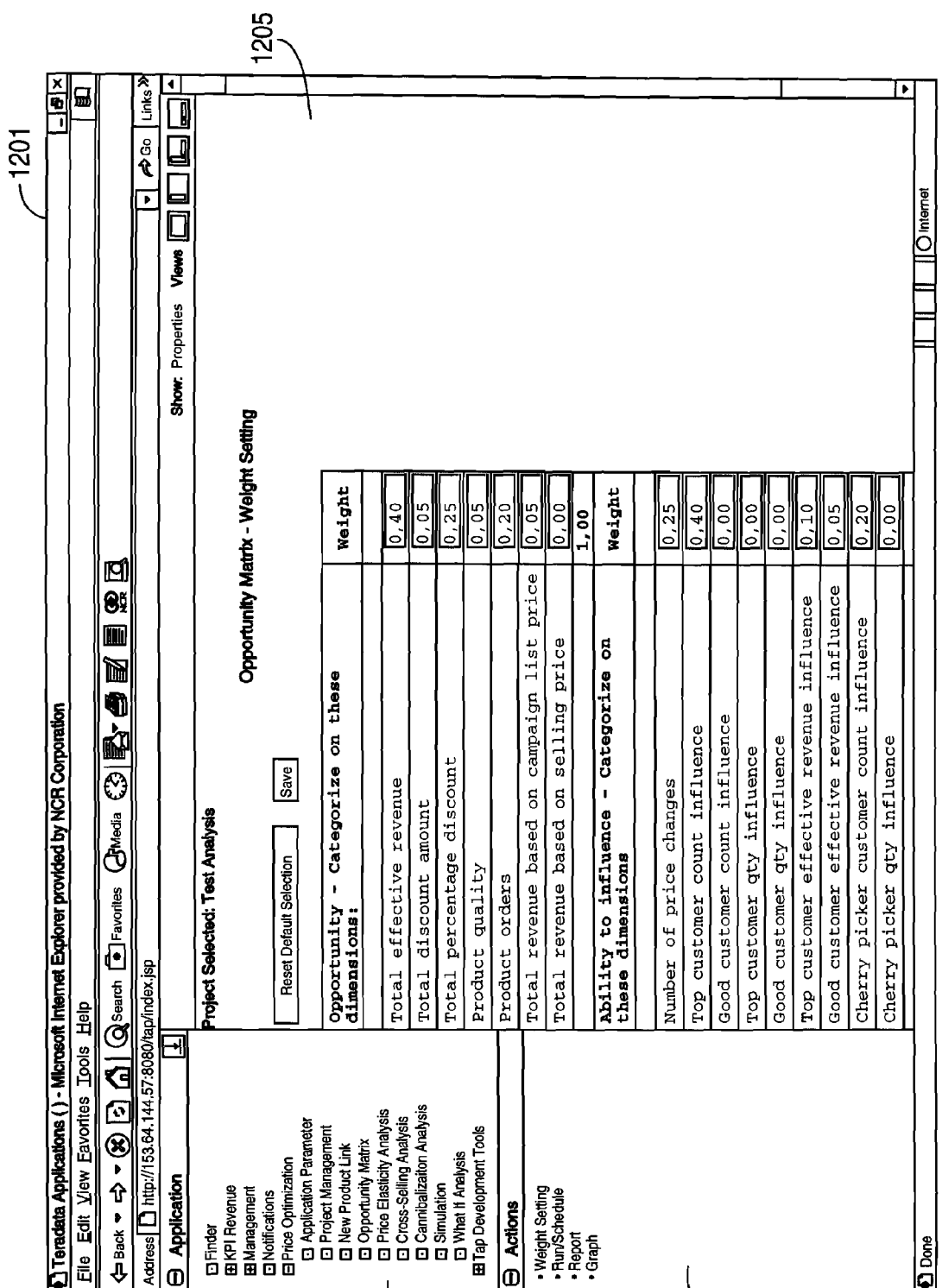
FIG. 12 provides a table listing the set of parameters that the user can modify to manipulate the location of the SKUs within the Opportunity Matrix quadrants illustrated in FIG. 10.

FIG. 12 provides a table listing the set of parameters that the user can modify to manipulate the location of the SKUs within the Opportunity Matrix quadrants illustrated in FIG. 10. As with FIG. 10, the table listing is displayed within the PO graphical user interface 1201. The parameters table is shown in the main workspace identified by reference numerals 1205.

Window 1207 identifies four actions available from the graphical user interface 1201: Weight Setting, Run/Schedule, Report, and Graph. FIGS. 30 through 36 illustrate various JAVA class diagrams involved in these actions. The Action classes provide the logic for creating and/or getting data that needs to be displayed on the user screen. Additionally, some of user input validation and business logic is performed in the Action classes.

Figure 31:
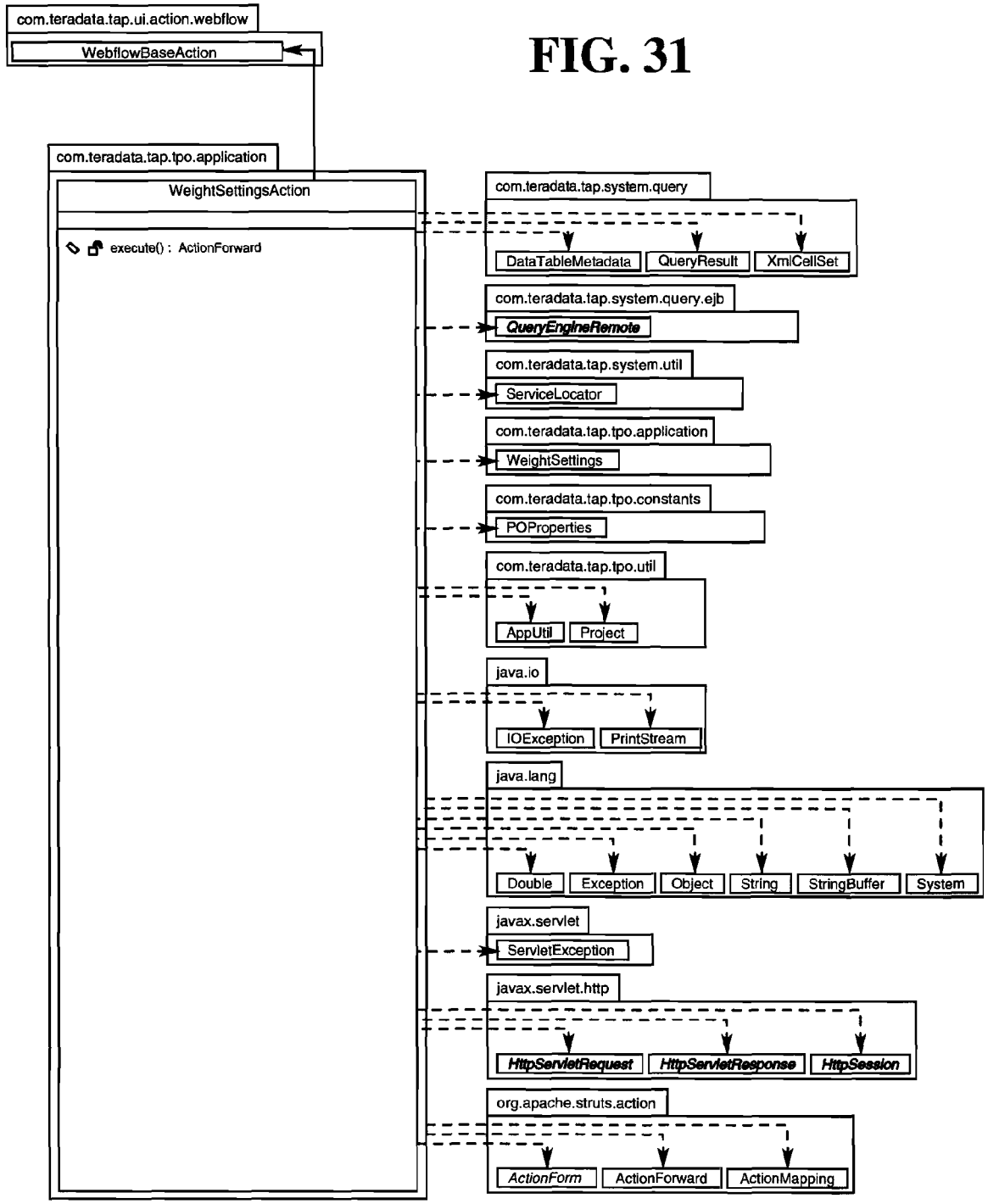
FIG. 31 provides a JAVA class diagram of the Opportunity Matrix module WeightSettingsAction class which loads the weight settings for the currently open project id.
Figure 32:
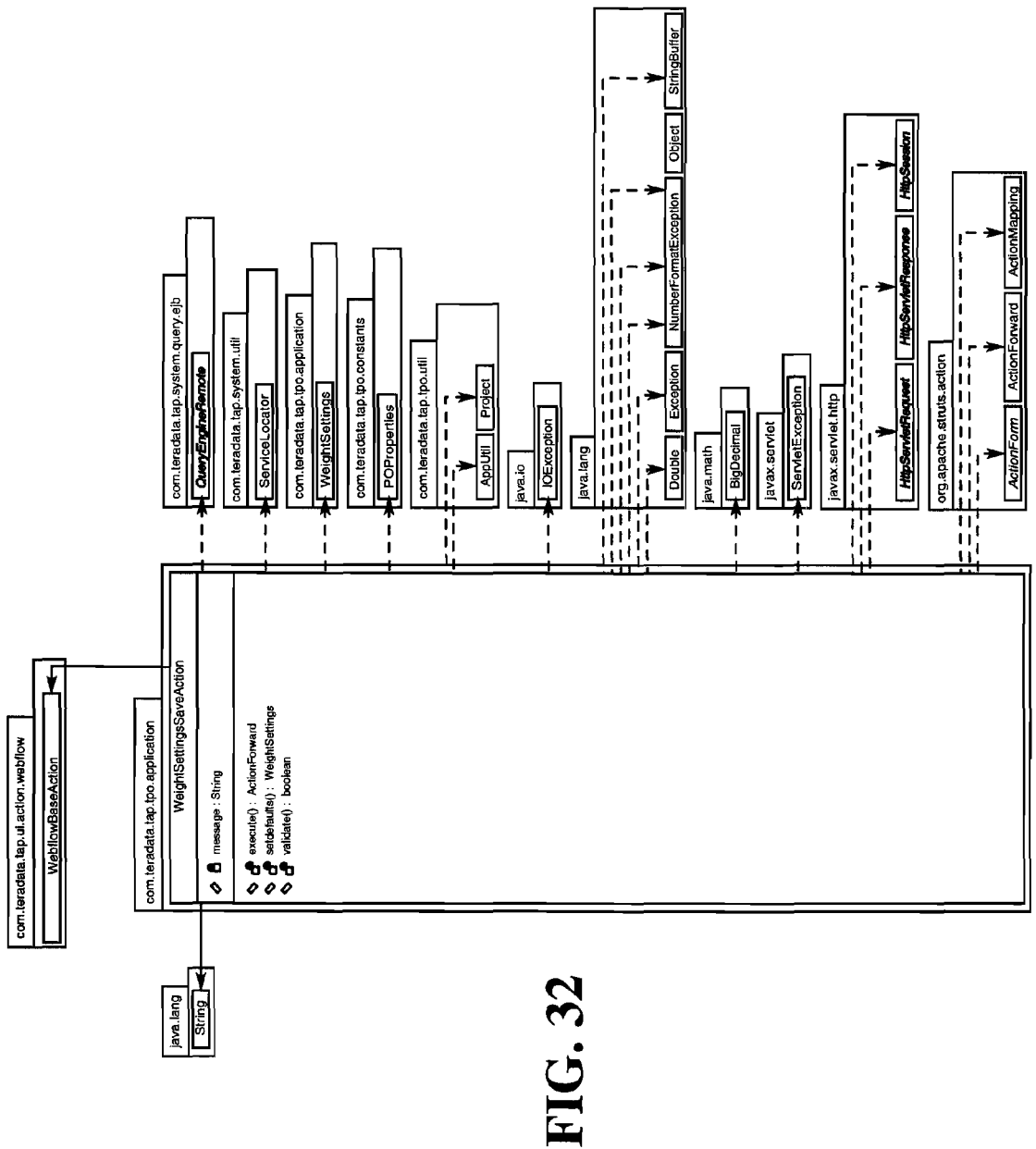
FIG. 32 provides a JAVA class diagram of the Opportunity Matrix module WeightSettingsSaveAction class.
Figure 33:
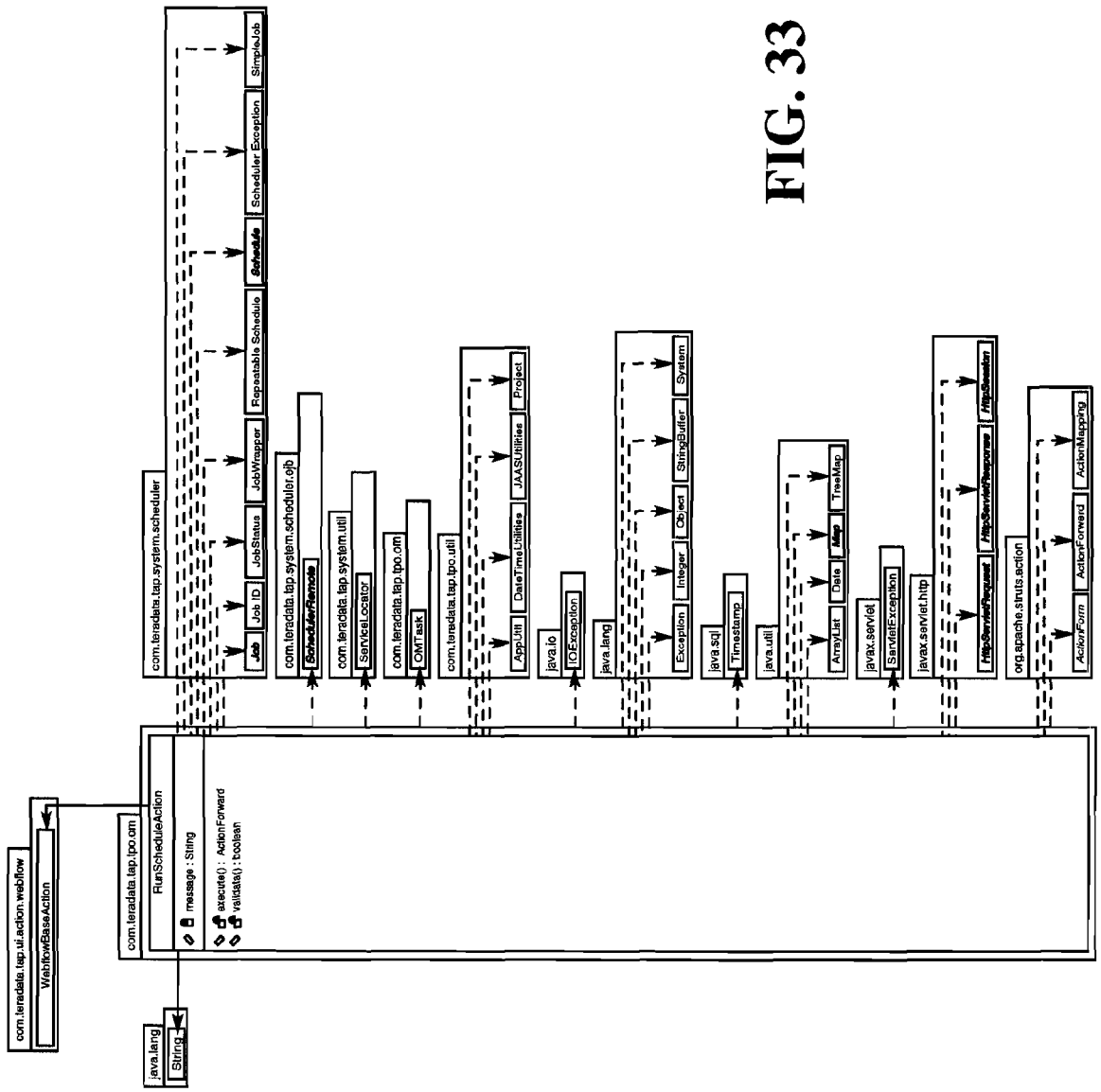
FIG. 33 provides a JAVA class diagram of the Opportunity Matrix module RunScheduleAction class.

The "Weight Settings" link will lead to the WeightSettingsAction class shown in FIG. 31. Request parameter PAGE_MODE is set to PAGE_MODE_SPECIFIC, forcing the action class to load the weight settings for the project id currently open. The request will be forwarded to the weightsettings.jsp page, shown in FIG. 30, in the Opportunity Matrix module which displays the attribute values. The user will then be able to make changes to the weight settings and submit them to the database. The WeightSettingsSaveAction class shown in FIG. 32, will update a PO_OM_WEIGHT table with these settings against the project id.

Figure 34:
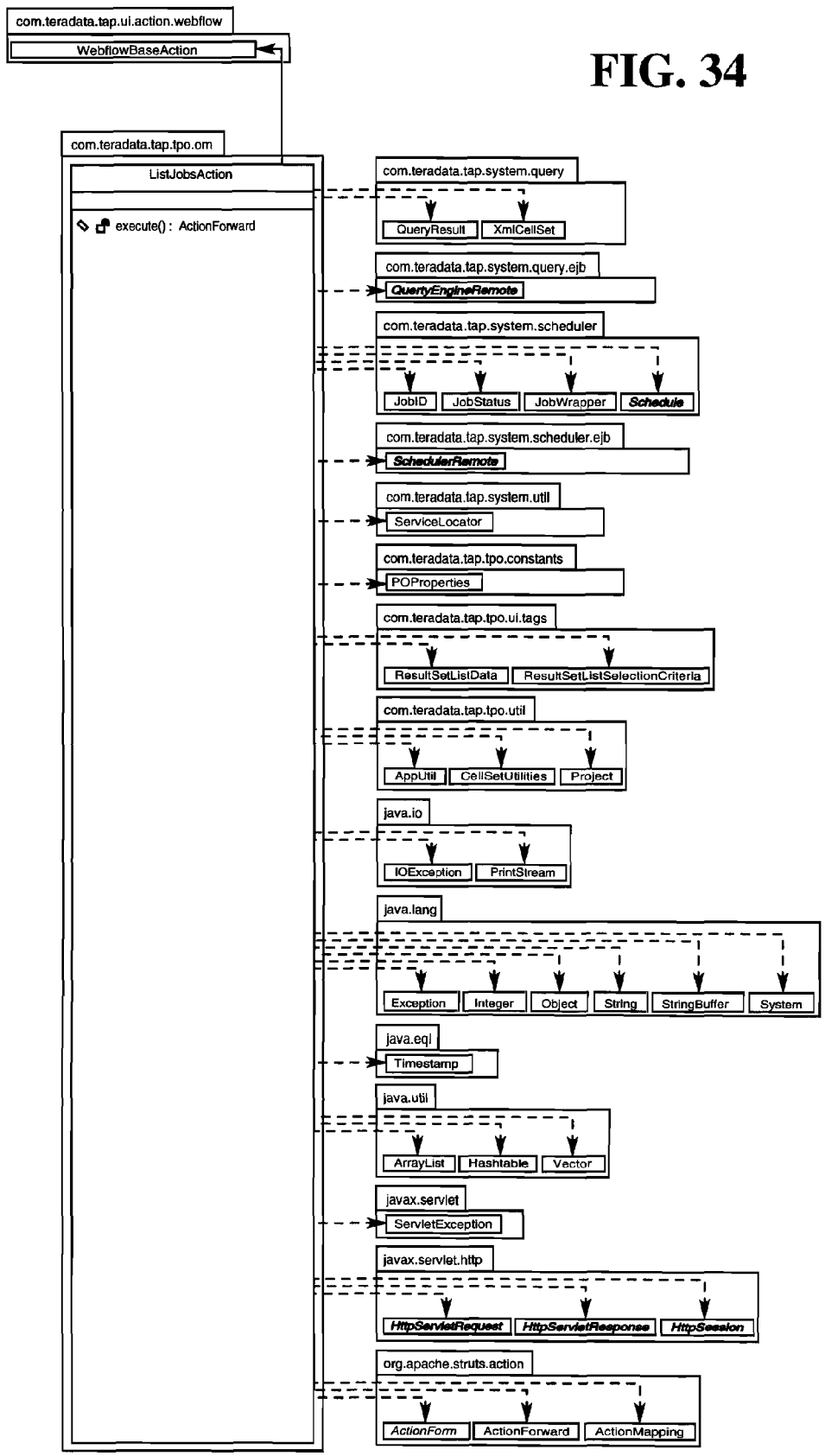
FIG. 34 provides a JAVA class diagram of the LisJobsAction class which prepares a list of currently running jobs for the Opportunity Matrix module.

The "Run/Schedule" link will lead to the ListJobsAction class illustrated in FIG. 34. This class will prepare a list of all the currently running jobs for the Opportunity Matrix module and any other modules and list them in the screen. It will use the Scheduler API and a temporary table with the results of the Opportunity Matrix Stored procedure. The link will display the list as well as a schedule screen to run a job or schedule it for another time. The submit selection on the scheduler form will forward the request to the RunScheduleAction class shown in FIG. 33 which will retrieve the schedule, validate dates if required and create a task to trigger the Opportunity Matrix stored-procedure using the data source specifically created for this purpose.

Figure 35:
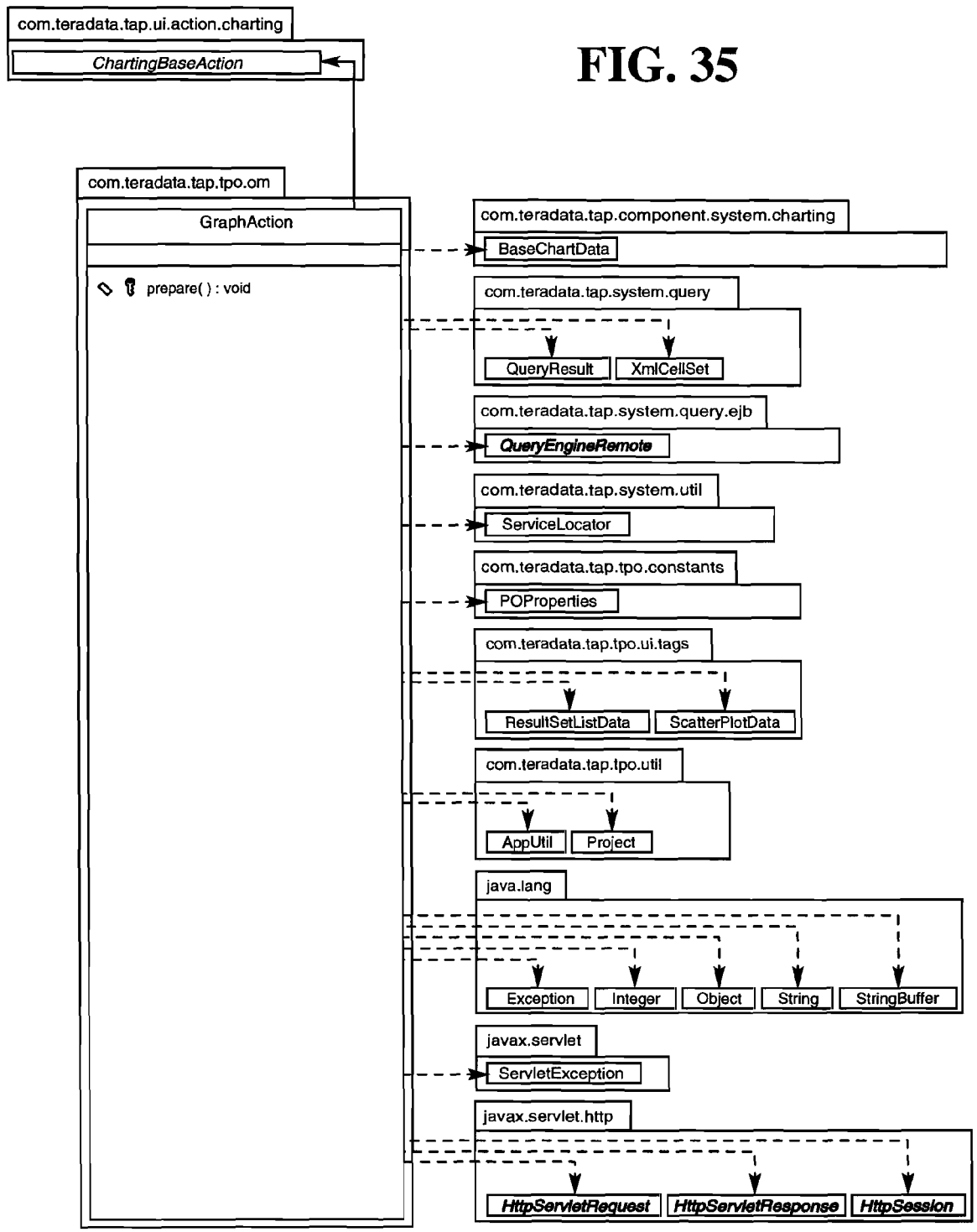
FIG. 35 provides a JAVA class diagram of the Opportunity Matrix module GraphAction class which assembles data to form a scatter plot.

The "Graph" link will lead to the GraphAction class shown in FIG. 35 for assembling data to form a scatter plot. The data is formatted and displayed together with a small report for the products on the same page. The user will be able to filter the product list by the product class. The selection of product class will change the plot for only the products that exist in that class. A "Mark/Un Mark" button is provided on the page to see the selected products marked or otherwise.

Figure 36:
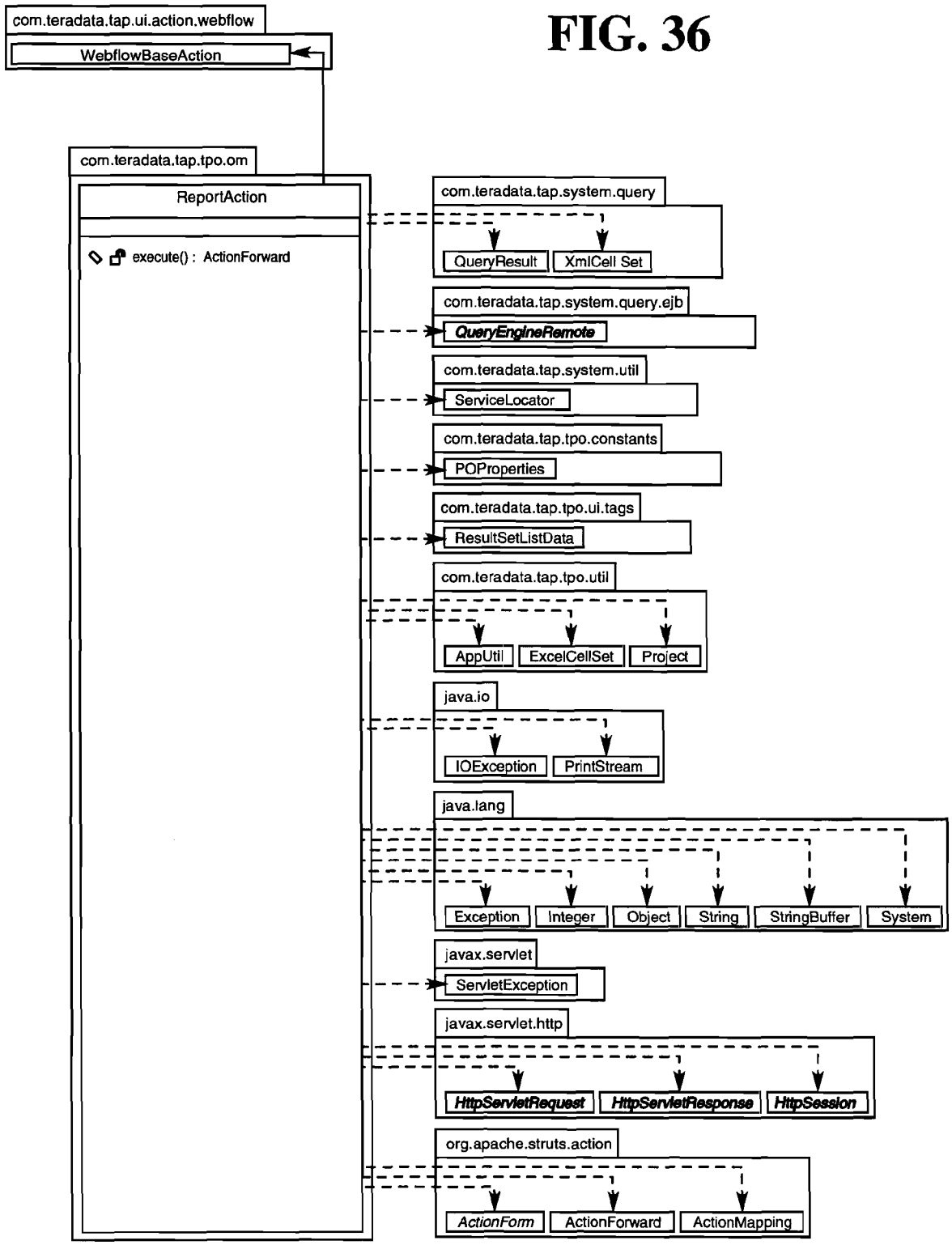
FIG. 36 provides a JAVA class diagram of the Opportunity Matrix module ReportAction class for assembling and displaying a report.

The "Report" link will lead to the ReportAction class shown in FIG. 36 for assembling and displaying a report. The user can select/de-select items listed on the report and save the selection.

Product Link

Before the OM and/or PE the user will have the choice of linking new products to any existing product identified in the data warehouse. Any new product in the catalogue can be linked to one and only one existing product.

After the PE calculation, for any product where no elasticity can be calculated, the user can optionally select a Linked product. For linked products the system will basically use the same formula as the reference product, only changing the cost. Effectively shifting the reference product PE chart up or down to calculate a new price/qty.

Process Logic

The product link module can be called from two places in the PO flow diagram shown in FIG. 4. One of the places is at step 406, following project creation. At this point in the flow of the application a target campaign has been selected. The reason new products need to be linked is that PE calculations can only be performed on products that have a history. New products do not yet have a history.

For products that do not have a PE coefficient assigned, the product link can also be called at step 418 after PE calculations have executed.

Figure 13:
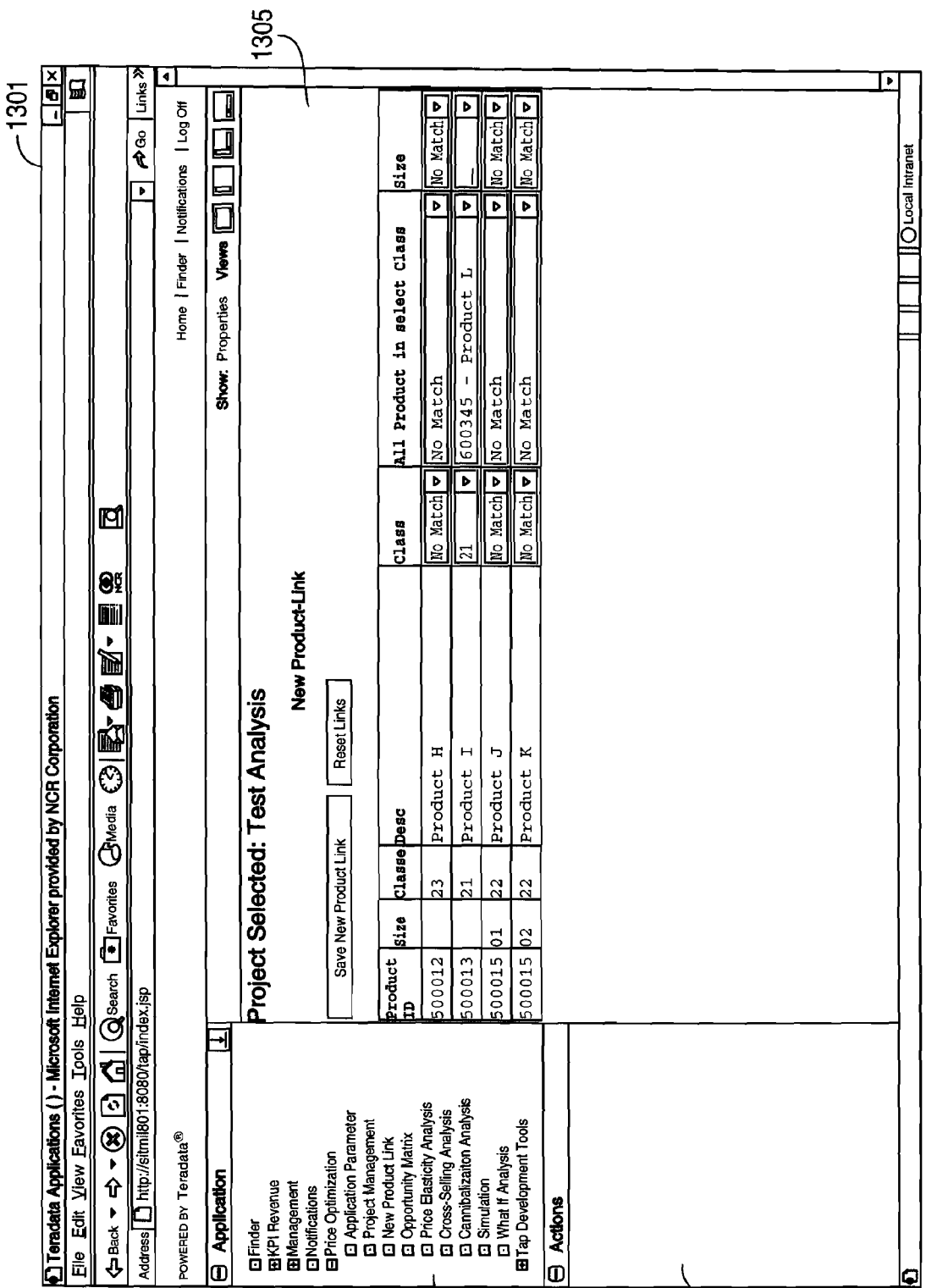
FIG. 13 illustrates a GUI screen for the product link module.

FIG. 13 illustrates a GUI screen 1302 for the product link module. A tabular listing of new product linkages is shown in the main workspace identified by reference numerals 1305.

Price Elasticity

The price elasticity module allows the user to generate price elasticity coefficients and report on price elasticity for the Campaign selected at project creation time. The price elasticity module will use the TAP Persistence Manager to persist Price Elasticity Analysis, Linear Regression and the Scoring components to generate the price elasticity coefficients; and the TAP Charting Service for rendering the output of the price elasticity analysis. TAP HTML Tag libraries are used for displaying the Price Elasticity report data in tabular form and the price elasticity property controls, such as dropdown menus for class selection. The TAP Scheduler service is used to schedule the Price Elasticity Task that will perform PE calculations and generate a result set object used to create the PE chart and the PE report.

A linear logarithmic regression model is usually used to calculate an elasticity coefficient. An elasticity coefficient less than −1 indicates that quantity is 'elastic' with price change. For example, if a product's elasticity coefficient is −2.08, when price decreases 1%, quantity increase by 2.08%.

Elasticity coefficients between −1 and 0 indicate that quantity is 'inelastic' with price change. For example, if a product has an elasticity coefficient of −0.731, when price increases by 1%, quantity decreases by 0.731%. In this case, an increase in price results in an increase in revenue because the impact of quantity decreasing on revenue is negligible.

Data Management

The analytical data set used for Price Elasticity analysis is shown below in Table 7.

TABLE 7

Price Elasticity Analytical Data Set

| Information | Description |
| --- | --- |
| COD_ARTICLE | product identification |
| COD_SIZE | size identification |
| COD_CAMPAIGN | campaign identification |
| FLAG_POSITION | Define if the product is Internal (flag = 0 or if the product in External (flag = 1) |
| FLAG_COMPONENT | Define if the product was sold like single product (flag = 0) or if the product was sold like component of compound product (flag = 1). |
| COD_CLASS_MERC | product class |
| PRZ_LISTING_OFFICIAL | official price |
| PRZ_LISTING_CAMPAIGN | campaign price |
| PRZ_EFFECTIVE | Effective price |
| QUANTITY | Quantity |
| LIST_CAMP_DISC_AMNT | discount amount from official price and campaign price |
| LIST_CAMP_DISC_PERC | percentage of discount amount from official price and campaign price |
| ADD_DISC_AMNT | discount amount from campaign price and Effective price |
| ADD_DISC_PERC | percentage of discount amount from campaign price and Effective price |
| LAST_COST | Latest product Cost (Avg Weight Cost) including adjustments |
| TOT_ORD_NUM | Total Order × Selected Campaign |

Linear Regression and Scoring Components

Teradata Warehouse Miner (TWM) provides three analytic algorithms to the TAP solution: Affinity/Association, Linear Regression, and Linear Regression Scoring. Although the TAP environment is constructed in Java, and the TWM environment is pure Microsoft, the application server will be a Windows platform, which greatly reduces the communication difficulties between the components.

To communicate with TWM, TAP uses Java native interface technology, or JNI. This technology allows Java to communicate with platform-dependent native code. Although the .NET technology found in TWM is not platform dependent, it also provides access to, and is accessible from, platform-dependent code using Platform Invoke (P-Invoke for short). This scenario allows a platform-dependent "middle man" to communicate with both Java and .NET, ensuring an optimal solution for Windows deployment.

Figure 14:
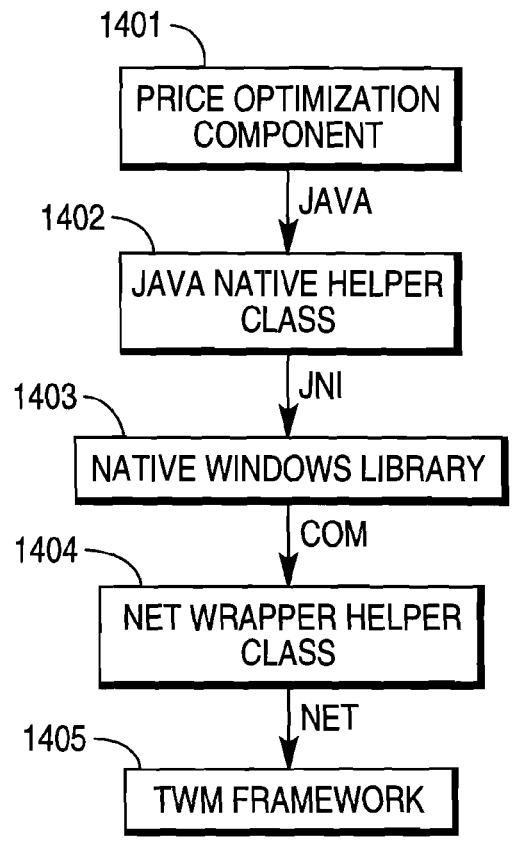
FIG. 14 shows a code flow diagram for the participants in a call from Teradata Application Platform to Teradata Warehouse Miner.

FIG. 14 shows a code flow diagram for the participants in a call from TAP to TWM. Note the addition of a .NET wrapper around the entire TWM framework. This wrapper serves two purposes: First, it reduces the complexity of the calls from Java by limiting the amount of information required. Second, it encapsulates the functionality available to the TAP platform, ensuring that only the required TWM functionality is available for consumption.

Since data must travel across several application domains using several languages, exception handling is a major concern. Support for exception handling is provided using a provider agnostic syntax. All APIs that handle cross-platform calls will return boolean indicators of success or failure. If a failure occurs, a special API can be called to retrieve the description of the last error that occurred.

Another language difference that must be accounted for involves how parameters are passed between methods. Both Java and C# (The TWM language of choice) pass parameters by value. The difference is that Java parameters can only be passed by value. For example, a call to execute a Linear Regression analysis must return a Boolean indicator to indicate if the analysis was successful, but it must also return the XML model. If an analysis must return multiple values in addition to the boolean success flag, those values can be implemented as Get methods in the class.

Figure 15:
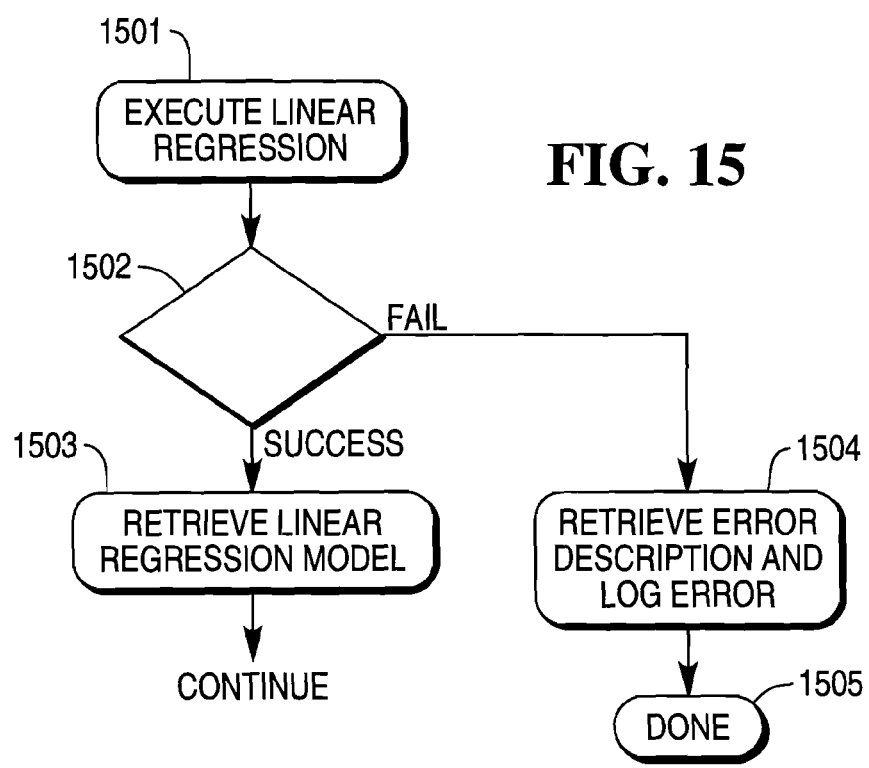
FIG. 15 illustrates a Linear Regression Activity Diagram.

Consider the linear regression activity diagram illustrated in FIG. 15. Note the introduction of an extra processing step after the executing Linear Regression in step 1501. A return of "false" from the API indicates that an error has occurred. Since the error message is only a string, it would be difficult to handle this message and continue. Even if the error had more identifying information, it would be difficult to assess the source and severity of the error. In most cases it would be beneficial to the application to exit from the above scenario instead of trying to continue.

Process Logic

Referring to FIG. 4, the user will be able to go to the PE module upon creation of the PO project (after step 410), or after selecting candidates by creating an Opportunity Matrix (after step 414). At this point the user can chose to schedule a PE calculation task (step 416). This calculation task involves creating a regression model for each product which will create a PE coefficient. Once the user is notified that the calculation task has been completed, the user can get the output of the calculation in two formats: graphically and/or tabular, as shown by reference numeral 427. As is the case with all tabular reports provided by the PO application, the user can sort by any column in the report. The user can also export the tabular report as a file in txt format, importable into Excel.

A global setting default of −6 is provided for the Elasticity Coefficient. Any item that has an elasticity coefficient less than or equal to this setting is highlighted in red as a warning that the coefficient might not be reliable. The application administrator user can modify this default.

The system should have a global setting that indicates how many models should be submitted by the system in parallel. The global setting will be modifiable by the admin user.

Once the Price Elasticity calculation is completed the user can access all other remaining modules. For example, the user can call the Product Link module to make sure that all products that had unreliable coefficients can be linked to like-products with solid coefficients for the purpose of the PO analysis (step 418). Or, the user may be satisfied with the result, and is interested in viewing products that have Cross Sell potential (step 420). Cannibalization is also available after PE has been calculated.

Figure 16:
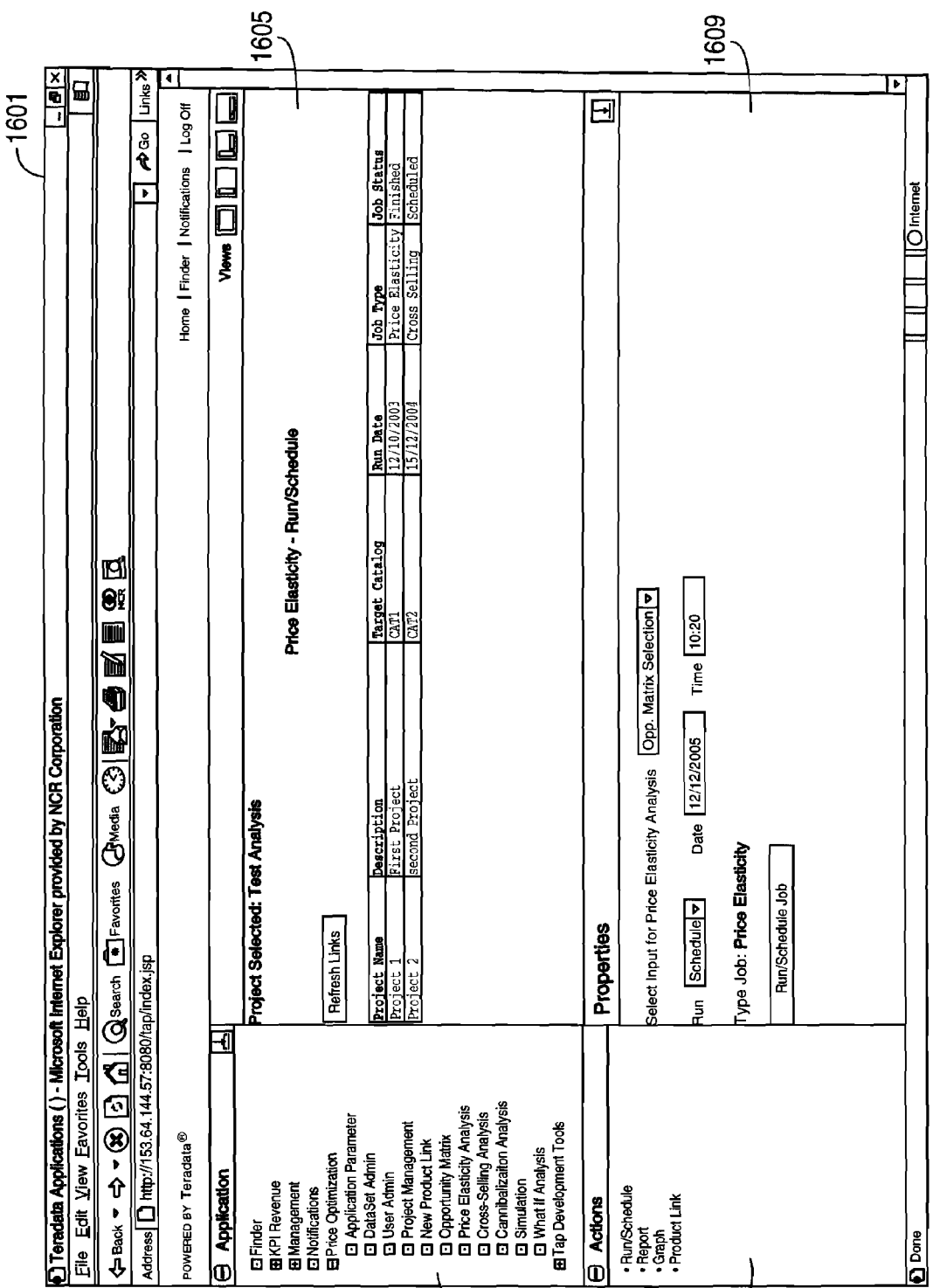
FIG. 16 shows a Price Elasticity task scheduling screen.
Figure 17:
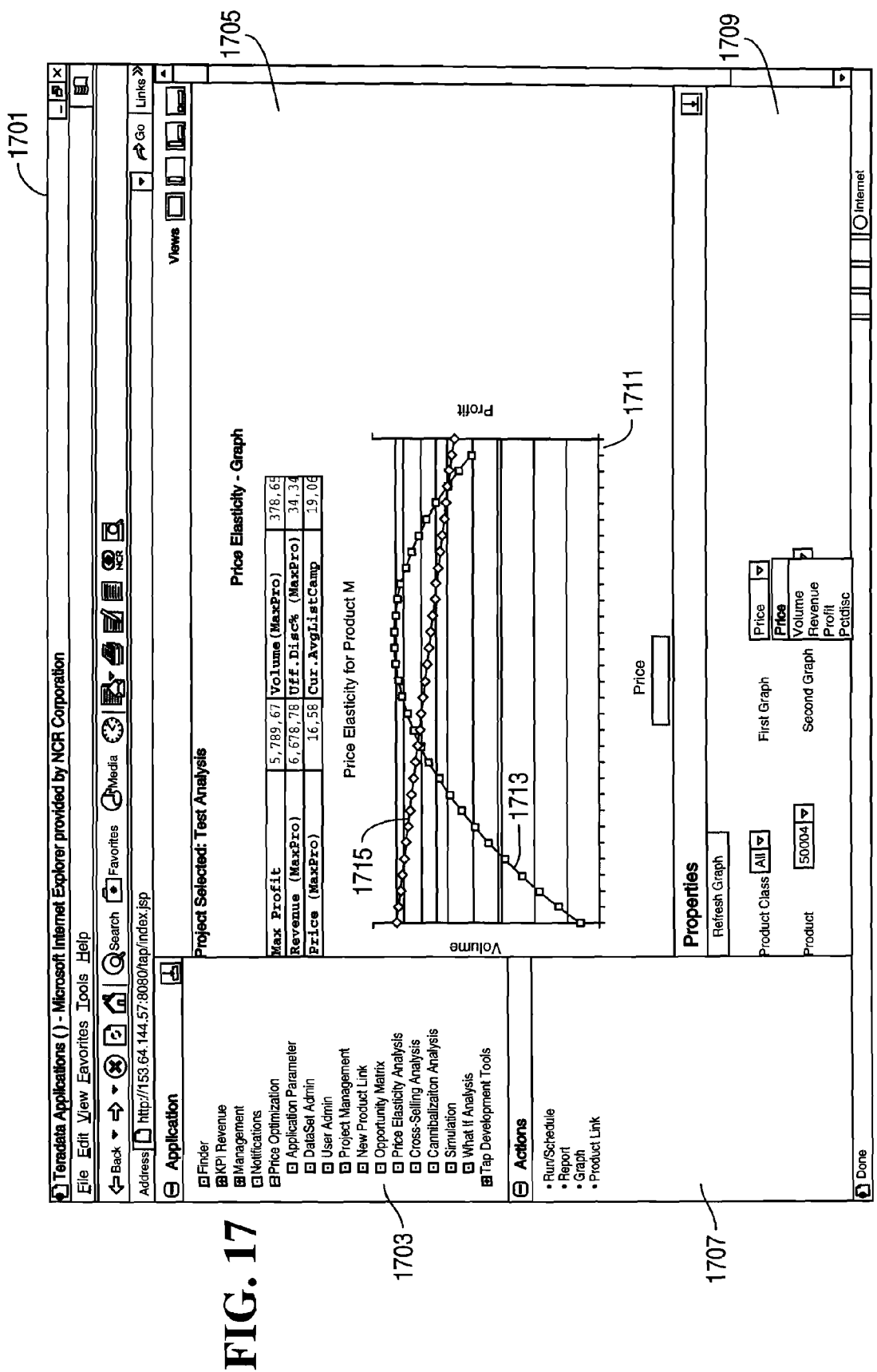
FIG. 17 illustrates a Price Elasticity charting screen.
Figure 18:
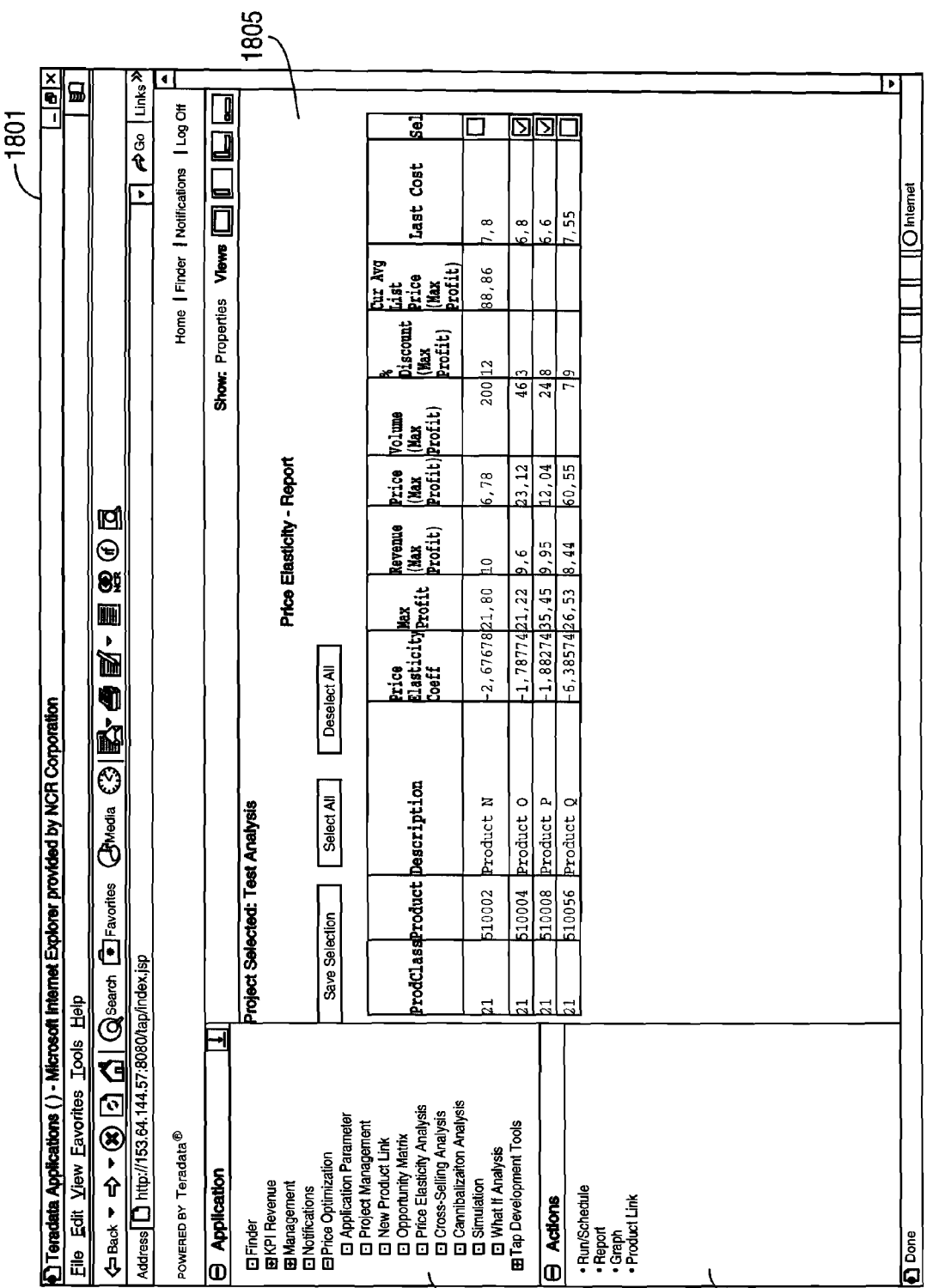
FIG. 18 shows a Price Elasticity tabular reporting screen.

There are three main screens in the PE module shown in FIGS. 16, 17 and 18. The first screen, shown in FIG. 16, is the PE task scheduling screen 1601. The properties section of the screen, identified by reference numeral 1609 will have the typical TAP scheduler control. The task can be run on demand or scheduled. The workspace section of the screen, identified by reference numeral 1605, shows a list of tasks that have been submitted and the status of each task.

The screen shown in FIG. 17 is the PE charting screen 1701. The workspace section of the screen, identified by reference numeral 1705, shows the key factors for the product shown in the graph. The chart shows both an elasticity curve 1713 as well as an average price line 1715. This line chart can be displayed for each product that has a PE coefficient. The properties section of the screen, identified by reference numeral 1709, has drop down menus that allow the user to select a product for the chart.

FIG. 18 shows the PE Tabular reporting screen 1801. This report highlights products with poor price elasticity. These can then be used in the Product Link module so that the products can be linked to like-products to improve the pricing model.

Item Cannibalization

Item Cannibalization implements the inverse of Cross-Sell. This module analyzes product sales histories and creates a model that identifies a negative affinity between products. In other words, it shows products that affect each other negatively given changes in price. This module requires PE to have been run in order to be available to the user.

Affinity Analysis

Item Cannibalization analysis is based on an Affinity model. For every product couple combination (Product A-Product B) this function returns the following coefficients:

Support—percentage of orders containing product A, product B or their combination on total number of orders considered Confidence—probability that product B is present in the orders where product A is present Lift—probability that presence of product B is decreased by presence of product A in the same order Z-Score—reliability of relation observed between product A and product B.

A virtual analytical dataset is created for each product to be analysed (pivot product) against other products (potential cannibalized product). For processing purposes the system should be able to submit models in parallel to the database. The system should not be restricted at running one model at the time. Linked products are excluded from the cannibalization calculation.

Data Management

The analytical data set used for Item Cannibalization analysis is described in the following table:

TABLE 8

Item Cannibalization Analytical Data Set

| Information | Description |
| --- | --- |
| COD_ARTICLE | |
| COD_SIZE | |
| COD_CAMPAIGN | |
| FLAG_POSITION | Product position within mailing: in catalogue or out of catalogue |
| FLAG_COMPONENT | Information about selling as single product or as component of compound/package product |
| PRZ_LIST_UFF | Official list price |
| PRZ_LIST_CAMP | Campaign list price |
| QTY | Quantity |
| LIST_CAMP_DISC_PERC | Campaign discount percentage |

Process Logic

The user is prompted to select a level of a product hierarchy, indicating what other products will be used to calculate cannibalization against the focus product. Only products that have elasticity values are included in this analysis.

The calculation for cannibalization can be scheduled for a specific date and time, or executed on demand. The user is notified or alerted upon completion. The cannibalization application module flow is shown by elements 421 and 422 of FIG. 4. Graph of tabular results can be provided as indicated by reference numeral 429.

The user can also initiate the cannibalization calculation from the Cross-Sell module. In this case the system will further restrict the product to calculate cannibalization to the products with a negative lift and a meaningful Z score.

Figure 19:
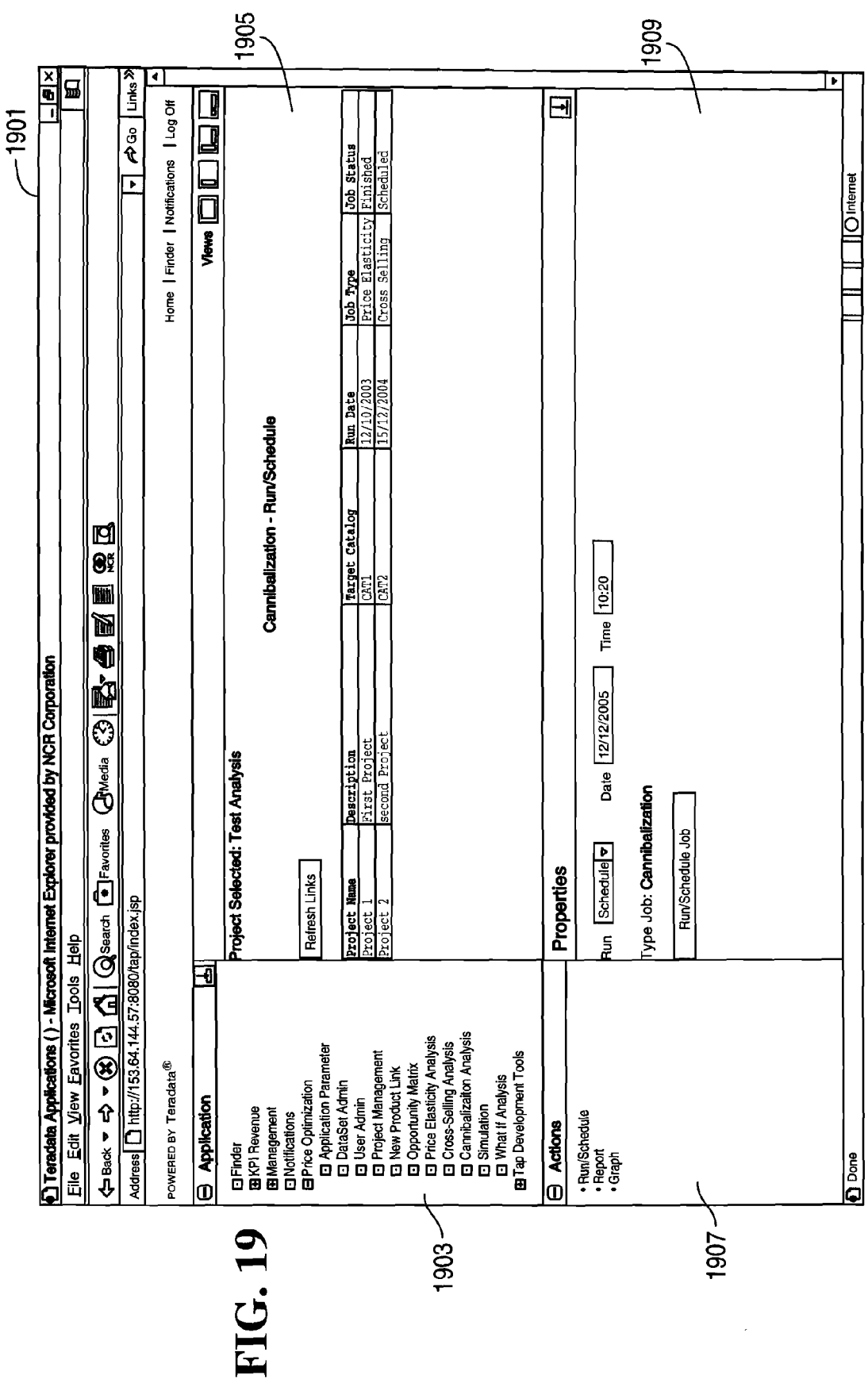
FIG. 19 shows an Item Cannibalization task scheduling screen.

There are three main screens in the Item Cannibalization module. The first screen, shown in FIG. 19, is the IC task scheduling screen 1901. The properties section of the screen, identified by reference numeral 1909, includes the typical TAP scheduler control. The task can be run on demand or scheduled. The workspace section of the screen, identified by reference numeral 1905, shows a list of tasks that have been submitted and the status of each task.

Figure 20:
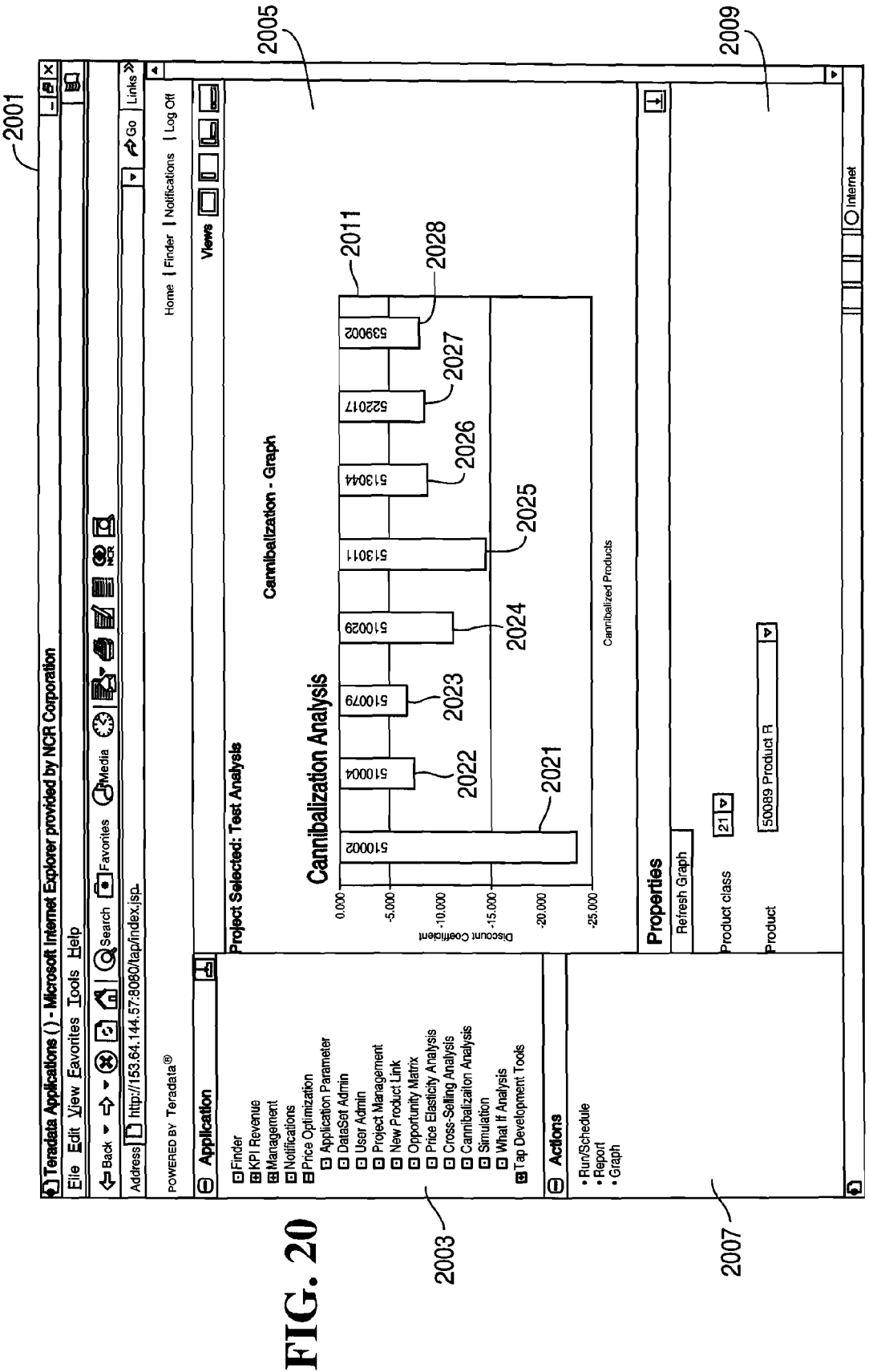
FIG. 20 illustrates an Item Cannibalization charting screen.
Figure 21:
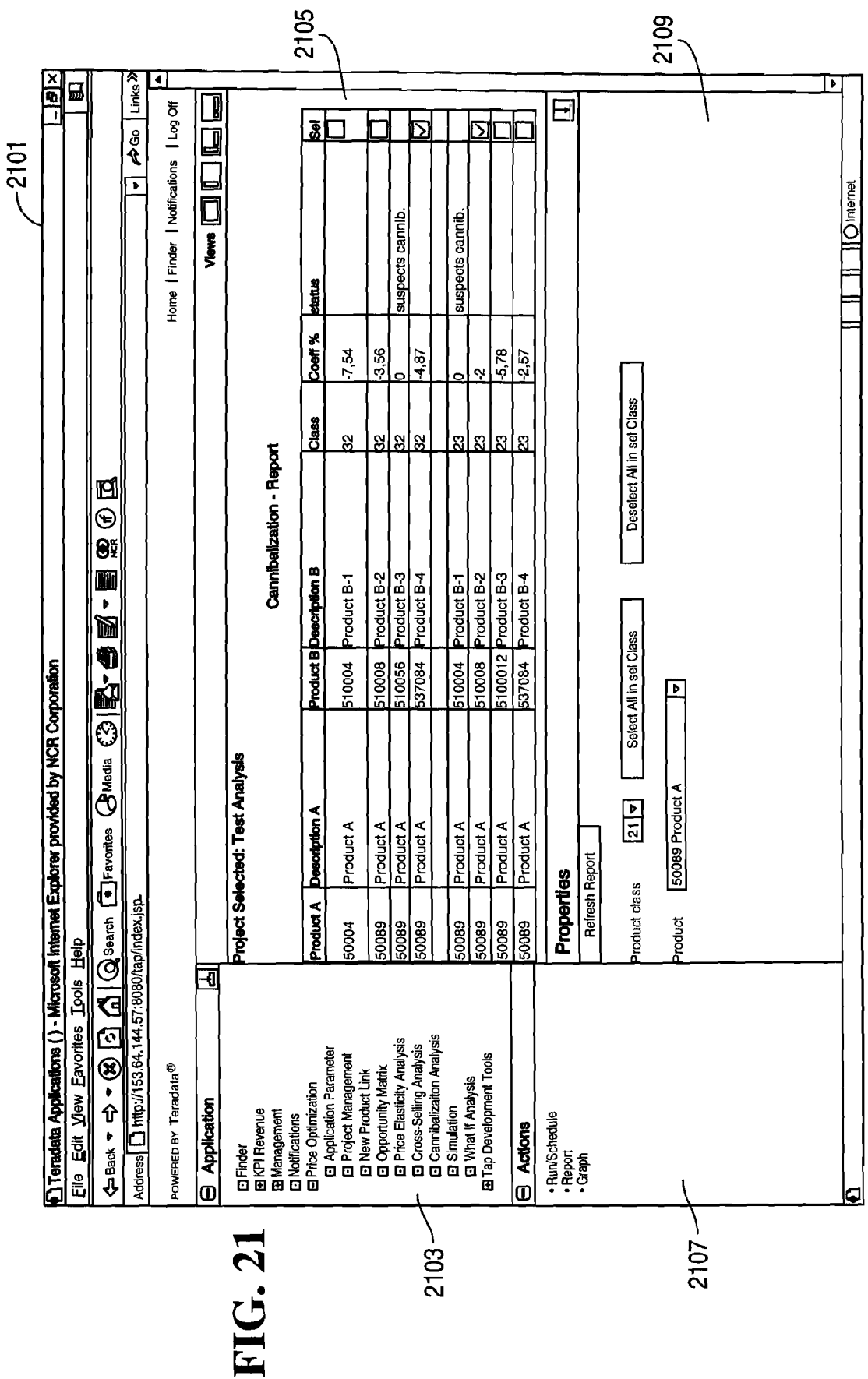
FIG. 21 shows an Item Cannibalization tabular reporting screen.

The screen shown in FIG. 20 is the IC charting screen 2001. The Cannibalization chart, illustrated in workspace section 2005, is a bar chart that shows the highest likelihood cannibalized selling products. Bars 2021 through 2028 illustrate the negative selling effect on several products when the price of a selected product is lowered. The properties section of the screen, identified by reference numeral 2009, includes drop down menus that allow the user to select a product for the chart. Once a new selection is made the chart will need to be refreshed. FIG. 21 shows the Item Cannibalization Tabular reporting screen 2101.

Item Cross Sell

Cross Selling analysis is based on the integration of Price Elasticity analysis results, in particular campaign price suggested, and affinity analysis. Cross Sell analysis is based on an Affinity model. For every product couple combination (Product A-Product B) this function returns the following coefficients:

Support—percentage of orders containing product A, product B or their combination on total number of orders considered Confidence—probability that product B is present in the orders where product A is present Lift—probability that presence of product B is increased by presence of product A in the same order.

Z-Score—reliability of relation observed between product A and product B.

The user can only select and enter the Cross Elasticity module when there is a Price Elasticity Calculation, and linked products are excluded from Cross Sell calculations. With the dataset the affinity model calculates support, confidence, lift and z-score for each product combination.

Only product pairs having positive cross elasticity are displayed. Additional calculations can be performed on results to infer volume, revenue, and profit changes. After a model run, the system calculates the "Z" score for the calculated model to determine if the coefficients are meaningful. Products that do not pass the "Z" score calculations are removed from results and an exception report will be generated.

The module provides screen displays showing the output of calculations in both graphical and tabular forms. The only products that are displayed in the output are those that pass the Z-score calculations and are deemed to have likelihood of cross selling.

For processing purposes the system is able to submit models in parallel to the database. The affinity component is a COM object provided by Teradata Warehouse Miner. This component is implemented in similar fashion to the Linear Regression and Scoring components covered in the discussion of Price Elasticity above.

Data Management

The analytical data set used for Cross Selling analysis is described in the following table:

TABLE 9

Cross Sell Analytical Data Set

| Information | Description |
| --- | --- |
| COD_ARTICLE | Product Code |
| COD_SIZE | Information about product |

TABLE 9-continued

Cross Sell Analytical Data Set

| Information | Description |
| --- | --- |
| COD_CAMPAIGN | Campaign Code |
| COD_CLIENT | Customer Code |
| ID_LNE | Raw number of table |
| NUM_ORDER | Order number |

Process Logic

The Cross Sell module is available once PE has been calculated. The calculation for cross sell can be scheduled for a specific date and time, or executed on demand. The user is notified or alerted upon completion. The cross sell application module flow is shown by elements 419 and 420 of FIG. 4. Graph or tabular results can be provided as indicated by reference numeral 428.

Figure 22:
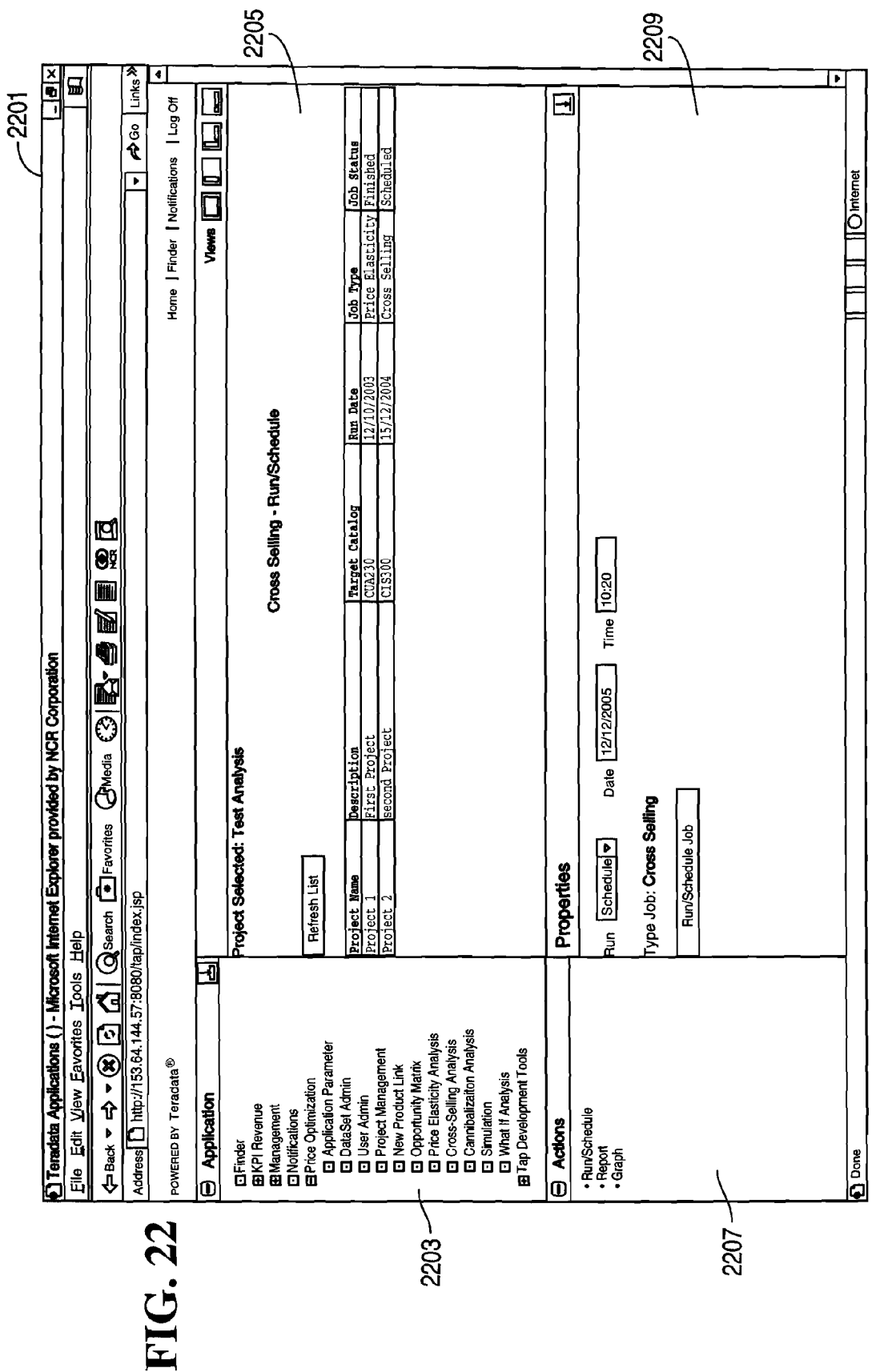
FIG. 22 show an Item Cross Sell task scheduling screen.

There are three main screens in the Item Cross Sell module. The first screen, shown in FIG. 22, is the ICE task scheduling screen 2201. The properties section of the screen, identified by reference numeral 2209, contains the typical TAP scheduler control, permitting tasks can be run on demand or scheduled. The workspace section of the screen, identified by reference numeral 2205, shows a list of tasks that have been submitted and the status of each task.

Figure 6:
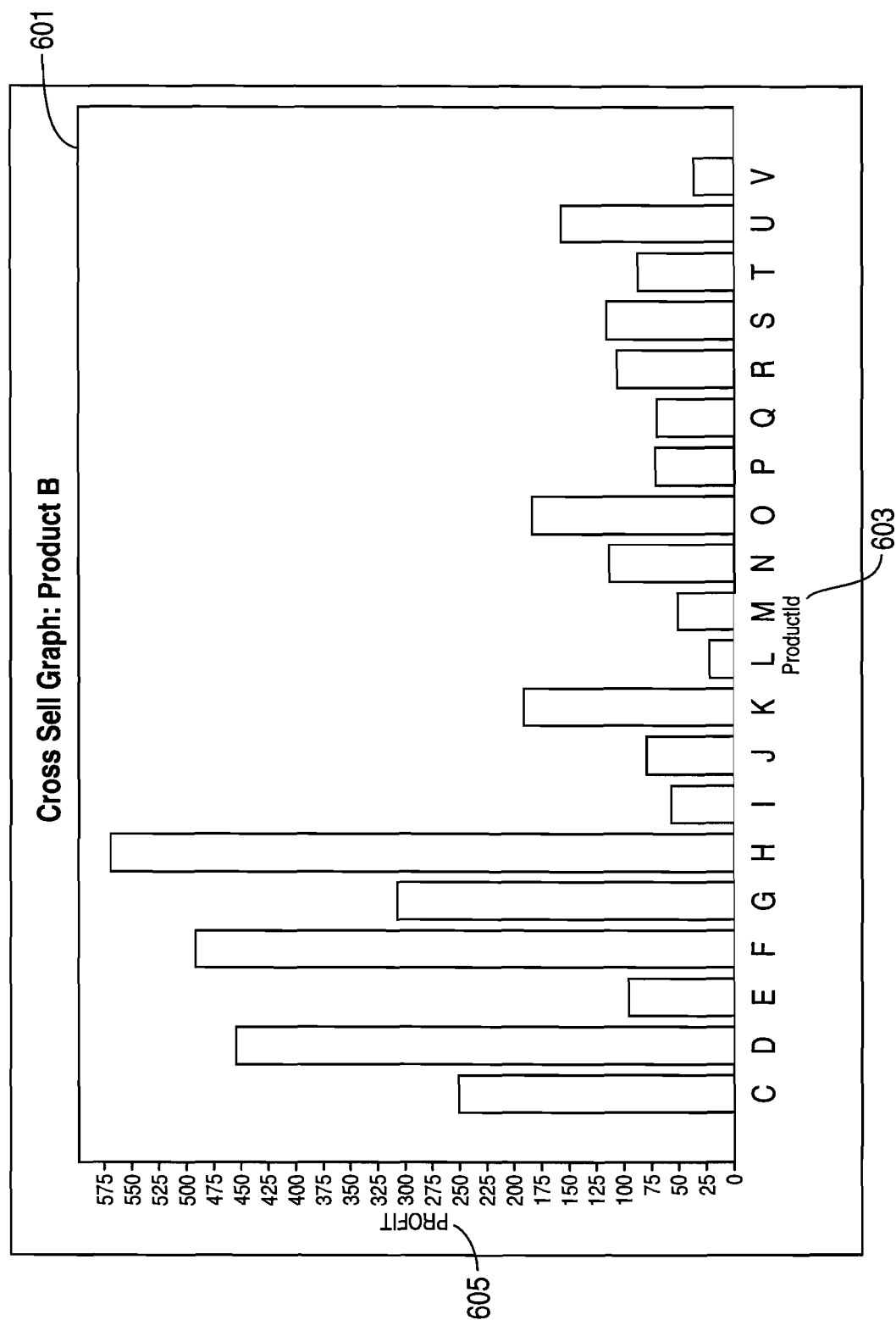
FIG. 6 provides a histogram illustrating the positive effect on profits associated with cross-sell products resulting from a decrease in the sales price of a product.
Figure 23:
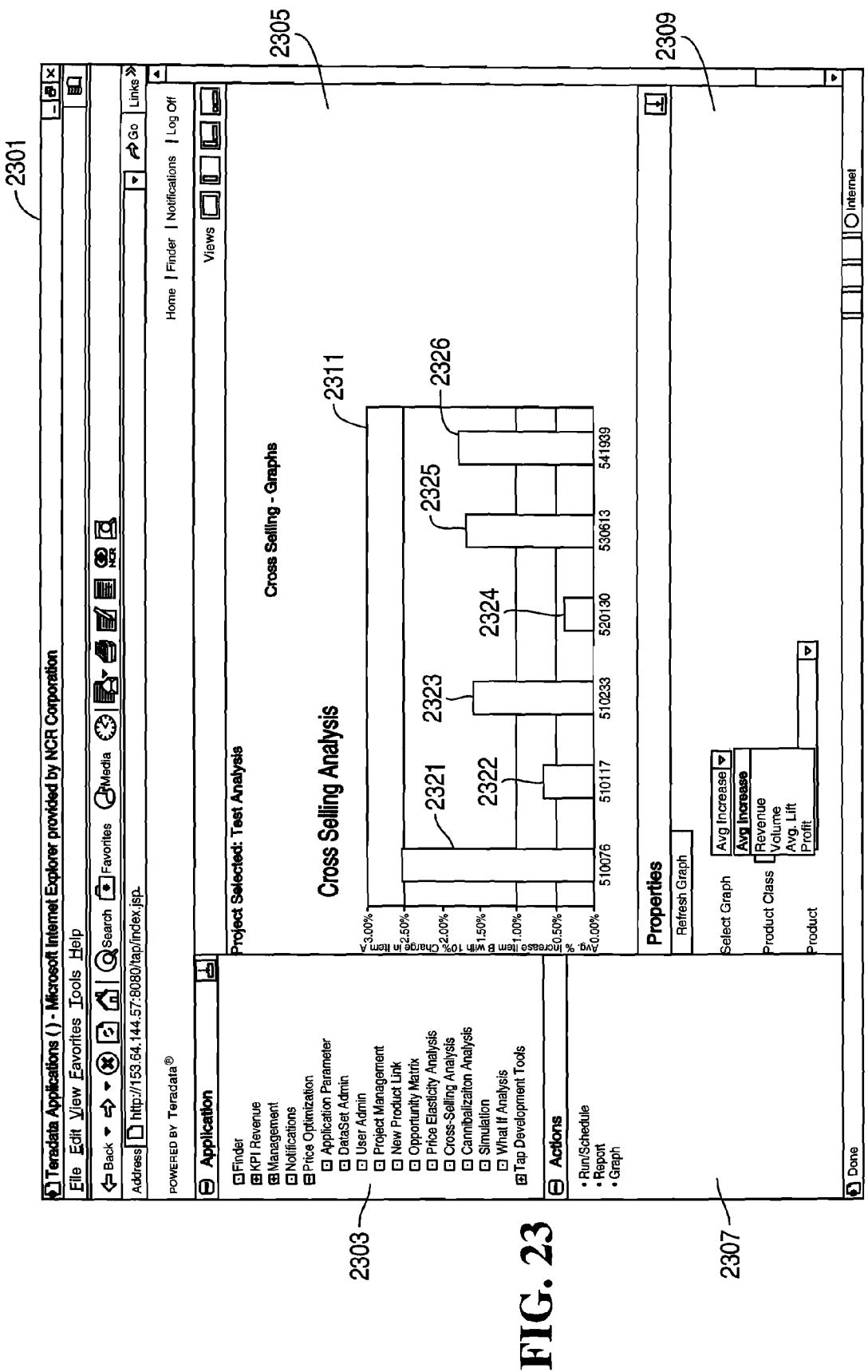
FIG. 23 illustrates an Item Cross Sell charting screen.

The screen shown in FIG. 23 is the ICE charting screen 2301. The Cross Sell chart 2311 illustrated in workspace section 2305 is a bar chart that shows the highest likelihood cross selling products. Bars 2321 through 2326 illustrate the positive selling effect on several products when the price of a selected product is lowered. The properties section of the screen, identified by reference numeral 2309, includes drop down menus that will allow the user to select a product for the chart. Once a new selection is made the chart will need to be refreshed. Another example of the cross-sell chart is shown in FIG. 6.

Figure 24:
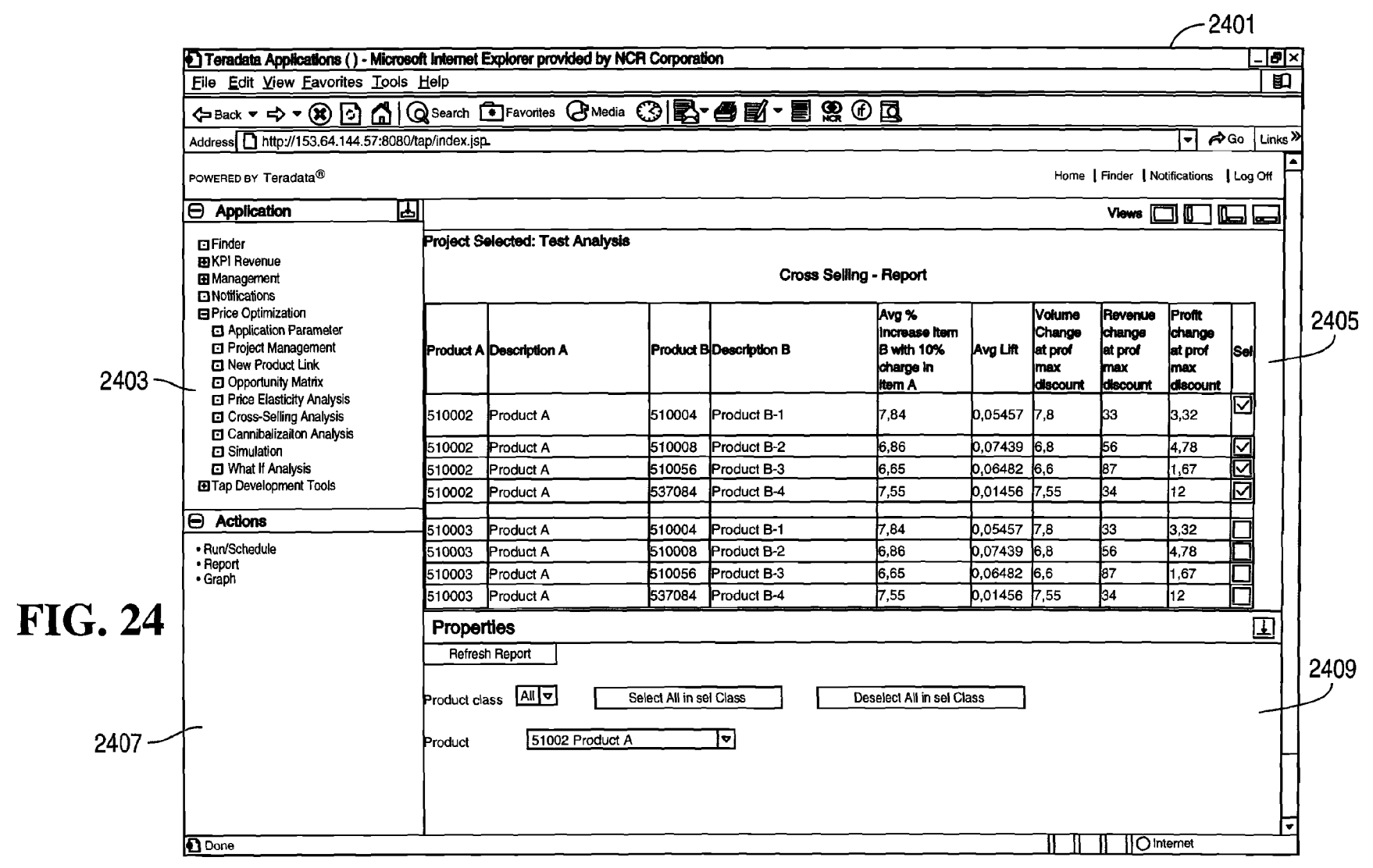

FIG. 24 shows the Cross Sell Tabular reporting screen. In the case of the tabular report, the user will also be able to export the file in txt format, importable into Excel Item Simulation The Item Simulation Analysis provides two renderings of Price Simulations. It combines PE, ICE and IC effects to calculate a result set and present a combined simulations chart of price vs. different key metrics, such as profits, while process are changing. It also calculates data for a chart that displays a comparison between a price curve and the average price at a product level.

Process Logic

Figure 8:
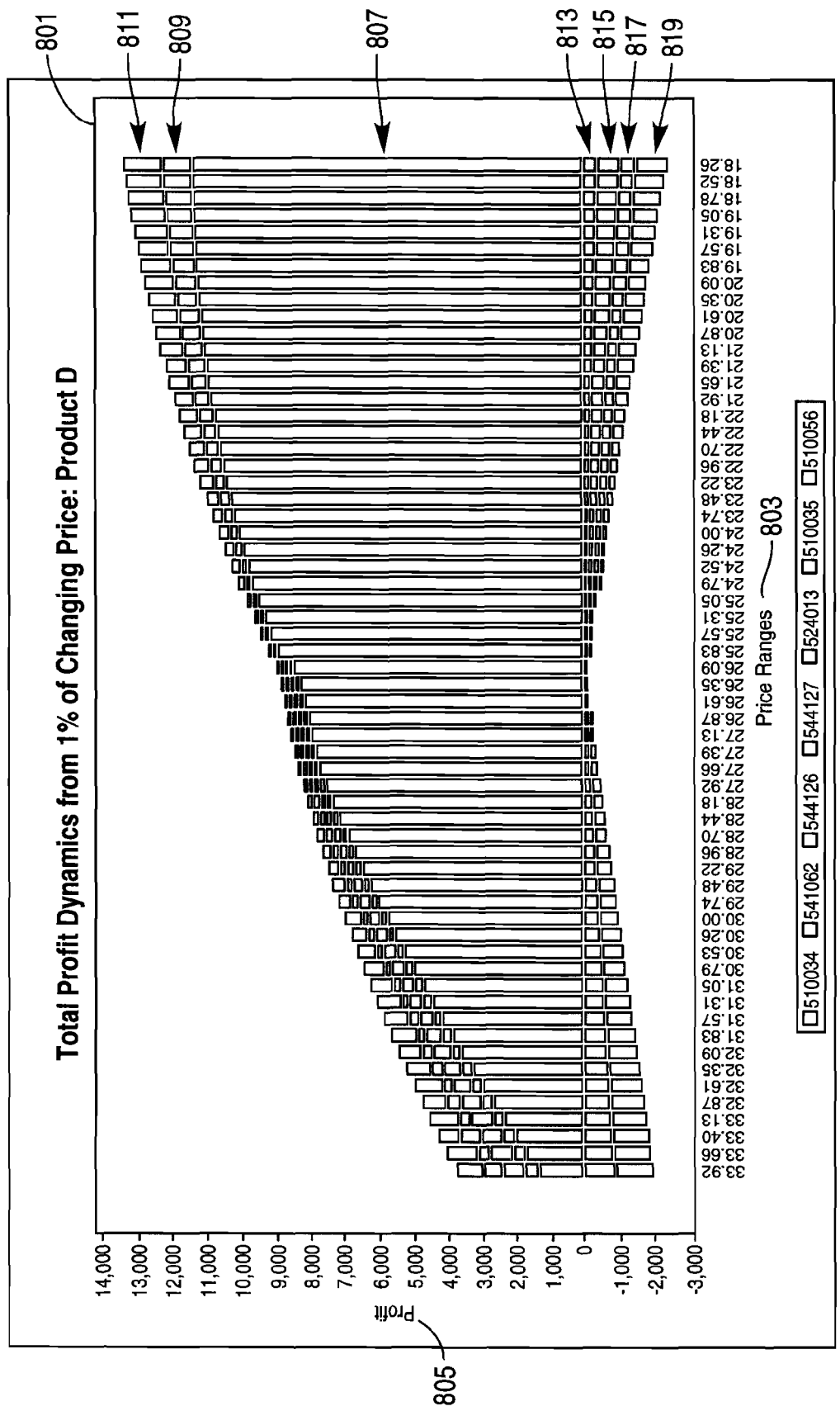
FIG. 8 provides a chart showing cross-sell and cannibalization effects at each percentage price change for exemplary Product FIG. 9 provides an illustration of an opportunity matrix chart, showing a plot of opportunity scores vs. ability to change scores for numerous products.
Figure 25:
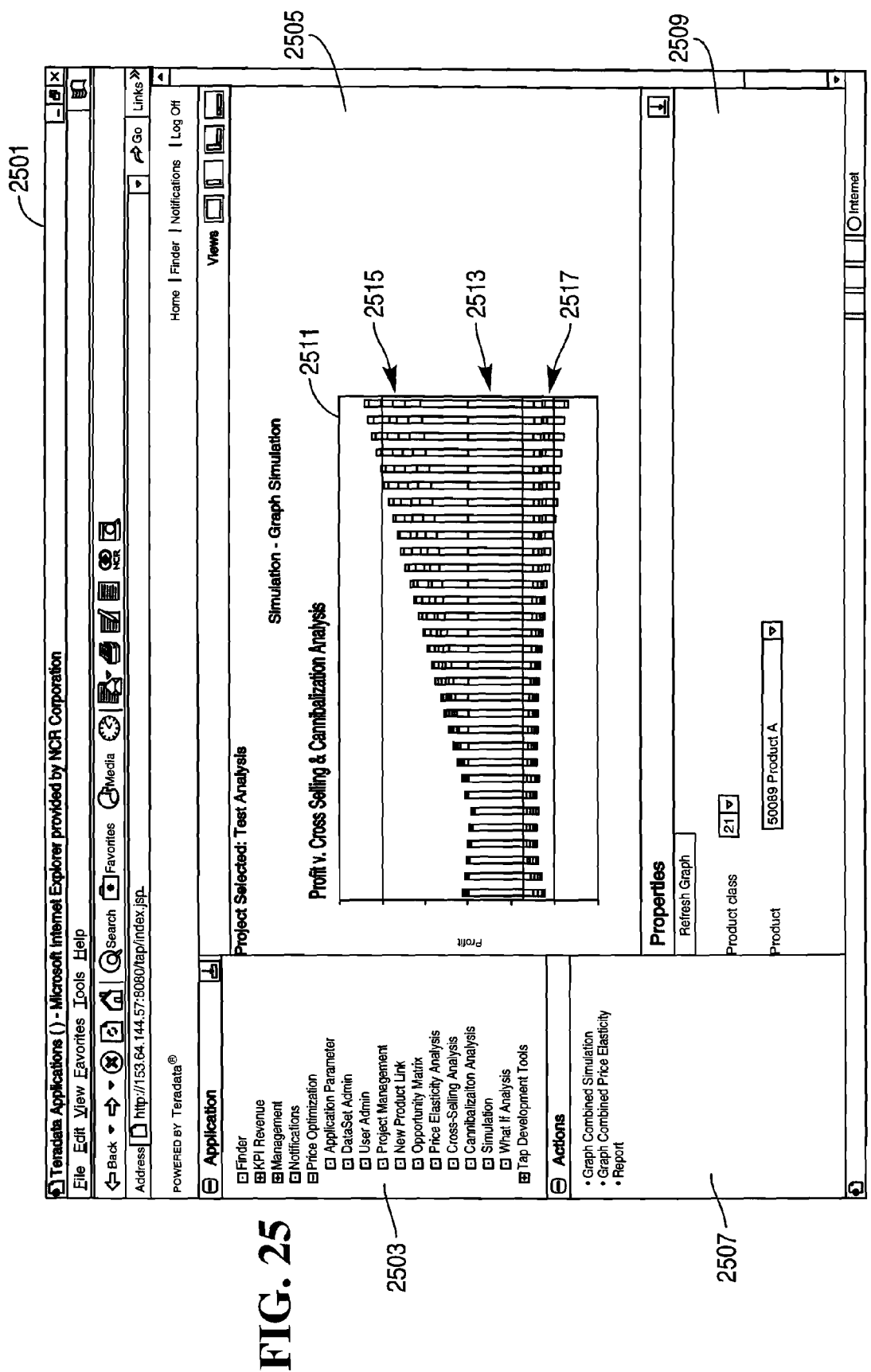
FIG. 25 shows a Combined Simulation Chart screen.

The Simulation application module combines output from the price elasticity, cross selling, and cannibalization modules as shown in step 423 of FIG. 4. Graph or tabular results are provided as indicated by reference numeral 431. A combined simulations chart 2511 of price vs. different key metrics, such as profit, is illustrated in workspace section 2505 of screen 2501 shown in FIG. 25. The chart illustrated in workspace 2505 shows cross-sell and cannibalization effects at each percentage change for a selected exemplary product. The bars in the center of the graph, identified by reference numeral 2513, show how profit generally increases as the price of the selected product decreases. To the right of the graph, bars 2515, located above bars 2513, illustrate profit increases associated with cross-sell products. Also to the right of the graph, but below the 0 (zero) profit line, bars 2517, illustrate the negative profit effects due to cannibalization products. Another example of a combined simulations chart is provided in FIG. 8.

Figure 7:
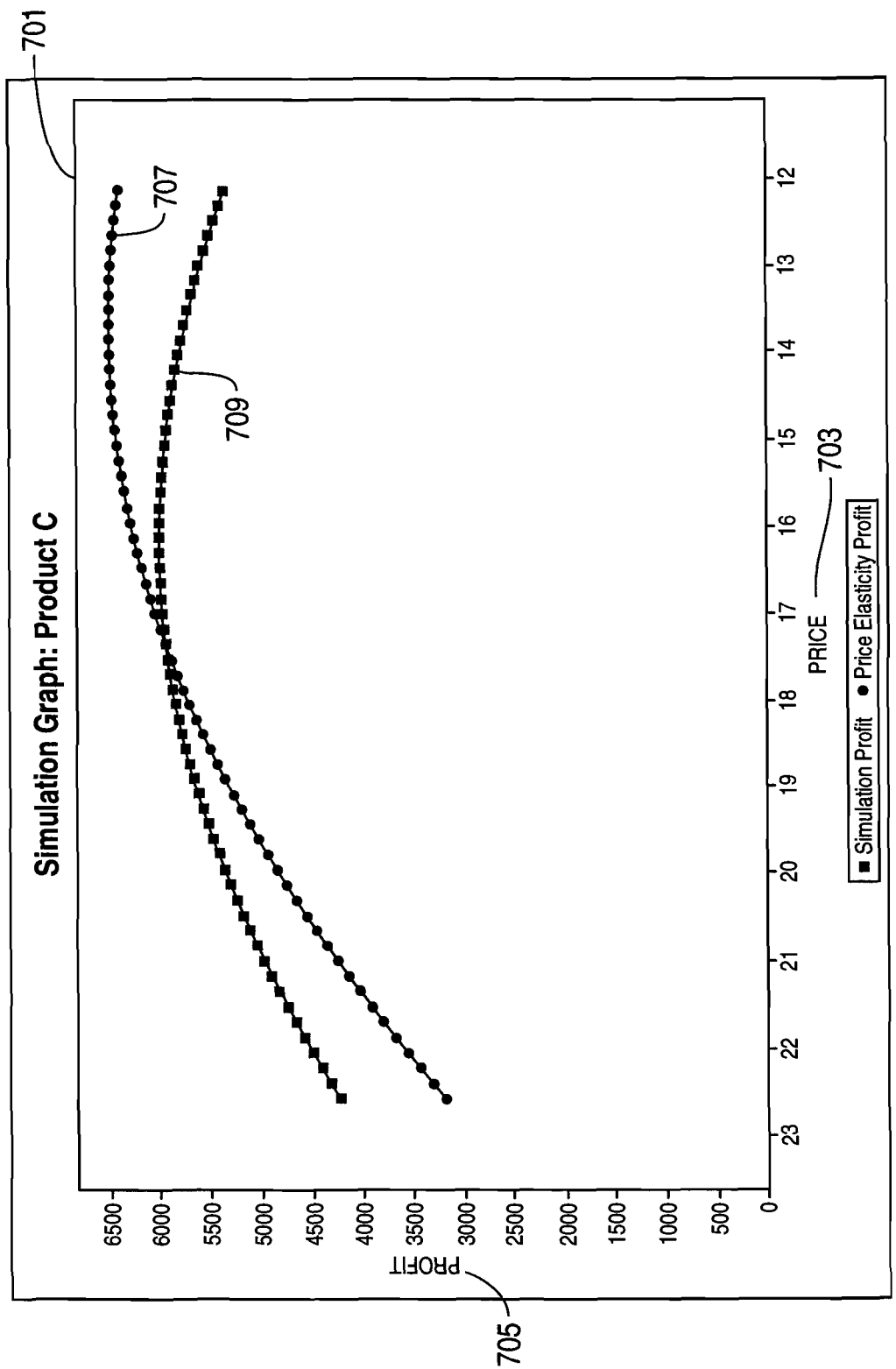
FIG. 7 provides a chart illustrating product price elasticity, including cross-sell and cannibalization effects resulting from changes in a products' price.
Figure 26:
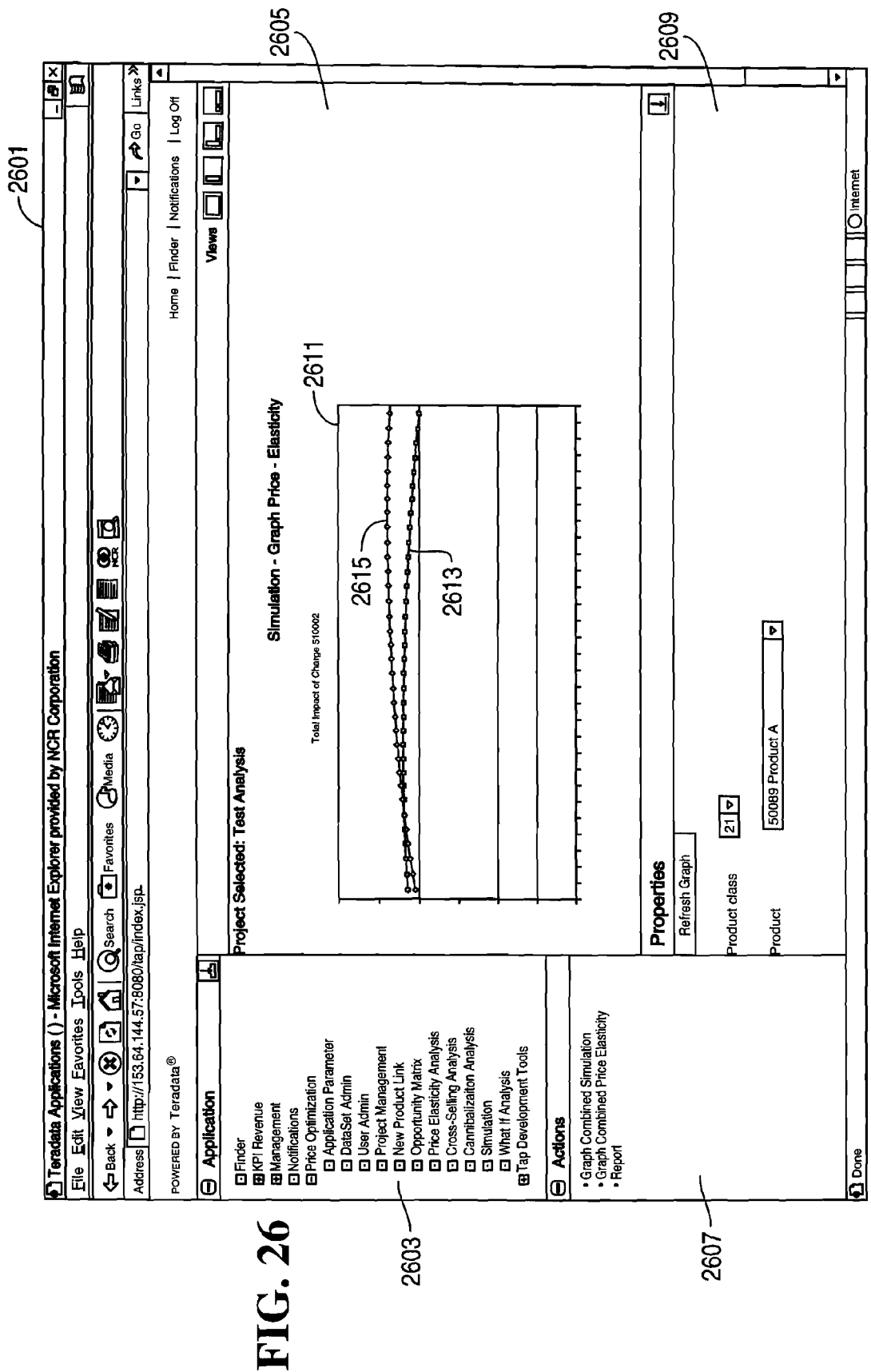
FIG. 26 illustrates a Pricing Simulation Chart screen.
Figure 27:
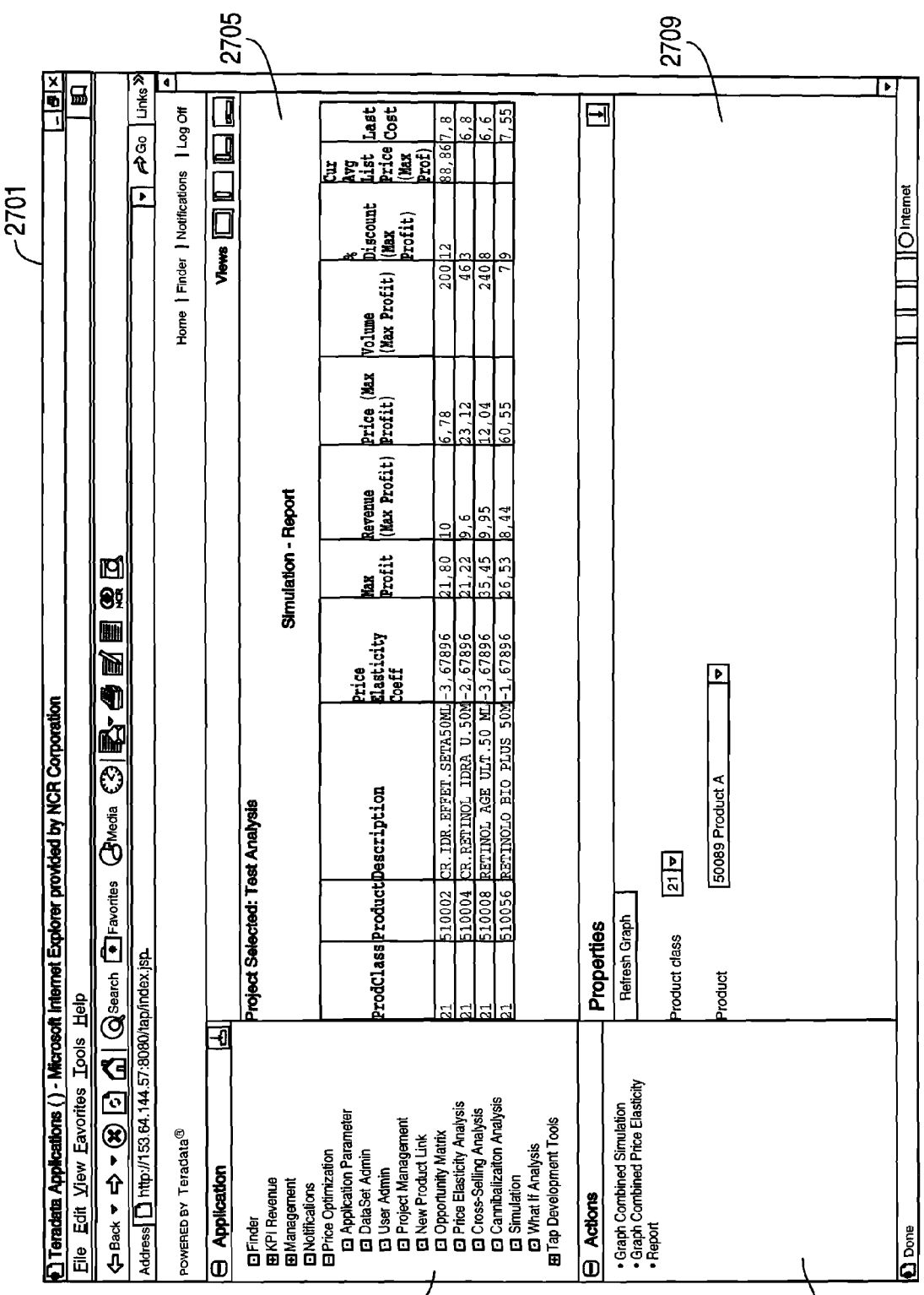
FIG. 27 shows a Simulation Report screen.

A simulations chart 2611 displaying price elasticity, including cross-sell and cannibalization effects, is illustrated in workspace section 2605 of screen 2601 shown in FIG. 26. Graph 2615 shows profit increasing as price decreases, based on the price elasticity of an exemplary product. Graph 2613 shows profits increasing, then decreasing, taking into consideration the elasticity of the exemplary product, plus all cross-sell and cannibalization effects. Another example of a simulations chart is provided in FIG. 7.

FIG. 24 shows a tabular simulation reporting screen.

What-If Analysis

Figure 29:
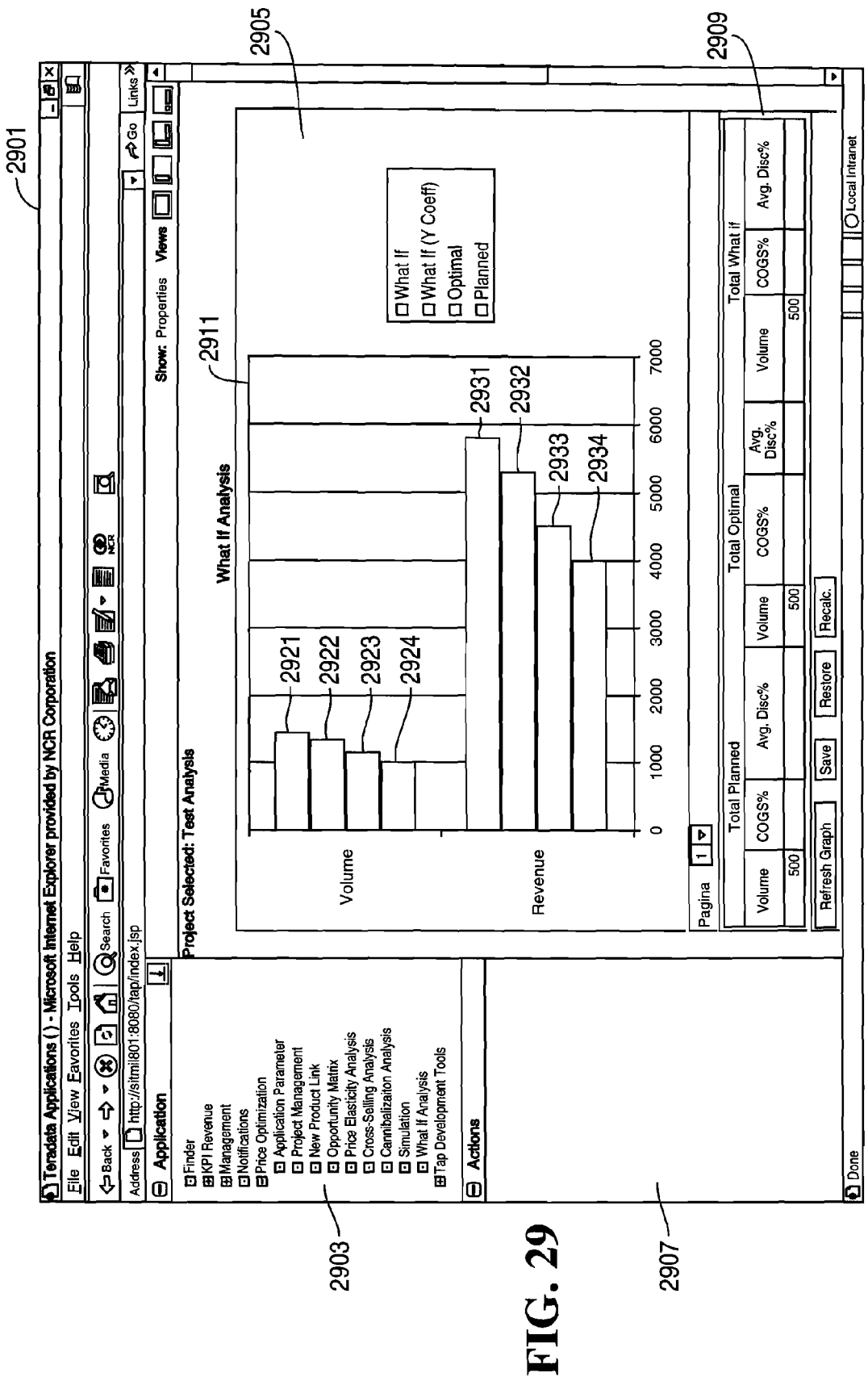
Figure 30:
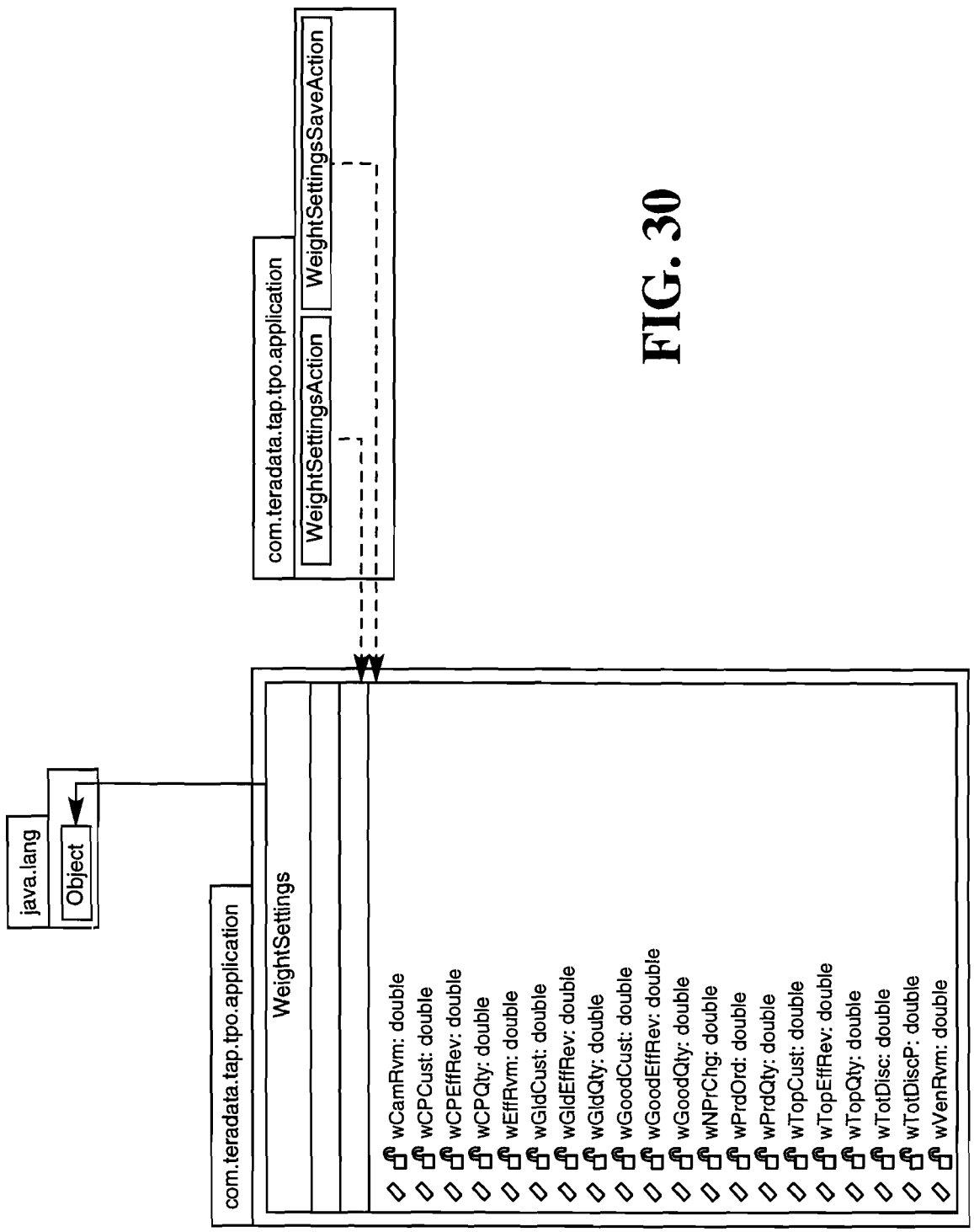
FIG. 30 provides an illustration of the Java Server Page weightsettings.jsp called from within the Opportunity Matrix module for viewing and modifying weight settings for SKUs displayed in the Opportunity Matrix.

The "What-If Analysis" presents a user with a table, shown in FIG. 29, that lists available products, planned prices and quantities (imported into the system), calculated optimal prices and quantities (results from the IS module), and then two added columns, one for "What if" Price, and "What If" Volume. In the "What If" Price column the users is able to type a new price, and the system will automatically populate the "What If" Volume. A combo box provides means for users to select products in the screen.

The what-if Volume is the quantity of the combined results "normalized" by the number of target orders of a target campaign. When a user changes the What-if price, all the products in the same group, e.g., lipsticks, are set with the same price.

Only products having calculated elasticity are available for the What-If analysis. "what if" results are not a forecast of product demand, rather, they are a calculation of expected quantity change applied to products, where the user makes additional price changes. Initially, both bars will be set to 0, since there are no changes. When all price changes are made, both bars will be set to the change.

Process Logic

Figure 28:
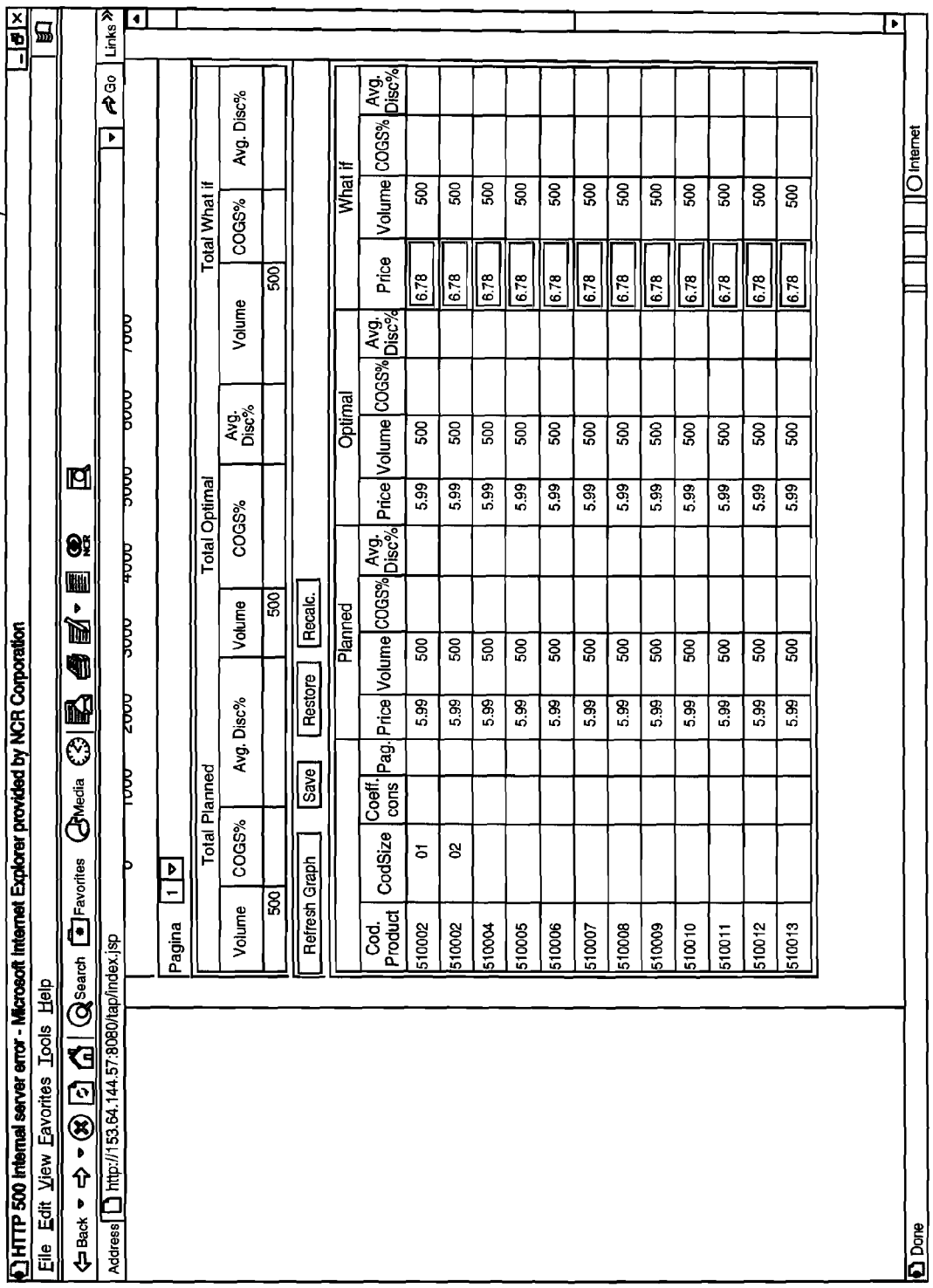
FIGS. 28 and 29 illustrate "What-If" input grid and chart, respectively.

Once Price Elasticity, Cross Sell and Cannibalization have been calculated "What-If" becomes available. The "What-If" process is shown in step 424 of FIG. 4. Graph or tabular results are provided as indicated by reference numeral 430. Referring again to FIG. 28, a user can modify the "What-If" Price column. When the user presses the "refresh" button then the system calculates the "what-if" results and renders a bar chart, illustrated in FIG. 29, displaying the effect of price changes on the original plan. The chart will display tree groups of bars for Revenue, Margine and Volume with the following measures:

1. Planned Revenue
2. Optimal Revenue
3. What-If Revenue
4. What-If Revenue without Link Products
5. Planned Volume
6. Optimal Volume
7. What-If Volume
8. What-If Volume without Link Products
9. Planned Margine
10. Optimal Margine
11. What-If Margine
12. What-If Margine without Link Products The system performs these calculation for the three different categories, planned, optimal and what if. In the case of the tabular report, the user will also be able to export the file in txt format.

The following additional Coefficients are also calculated by the application on the What-If Screens at single product level and at total campaign level.

TABLE 10

Additional Coefficients

| Coefficients | Formula | Scenario |
|---|---|---|
| Consumer Coefficient | Cons. Coeff = Qty Products/# Orders Target Campaign | Planned |
| Consumer Coefficient | Cons. Coeff = Qty Products/# Orders Target Campaign | Optimal |
| Consumer Coefficient | Cons. Coeff = Qty Products/# Orders Target Campaign | What-If |
| Cost Of Good Sold % | CoGS = (Product Cost × Qty/ Planned Price × Qty) | Planned (Product and Total Level) |
| Cost Of Good Sold % | CoGS = (Product Cost × Qty/ Optimal Price × Qty) | Optimal (Product and Total Level) |
| Cost Of Good Sold % | CoGS = (Product Cost × Qty/ What-If Price × Qty) | What-If (Product and Total Level) |
| Avg Discount % | Avg Disc % = 1 − (Product revenue at Planned Price/ Revenue At List Price) | Planned (Product and Total Level) |
| Avg Discount % | Avg Disc % = 1 − (Product revenue at Optimal price/ Revenue At List Price) | Optimal (Product and Total Level) |
| Avg Discount % | Avg Disc % = 1 − (Product revenue at What If price/ Revenue At List Price) | What-If (Product and Total Level) |
| Avg Order Amount | Total Revenue Campaign Target//# Orders Target Campaign | Planned Total Level Only Instead of Volume Measure in FIG. 28 |
| Avg Order Amount | Total Revenue Campaign Target//# Orders Target Campaign | Optimal Total Level Only Instead of Volume Measure in FIG. 28 |
| Avg Order Amount | Total Revenue Campaign Target//# Orders Target Campaign | What-If Total Level Only Instead of Volume Measure in FIG. 28 |

CONCLUSION

The Figures and description of the invention provided above a data warehouse system and application which analyzes historical sales and product data contained within a data warehouse to determine the best product prices across a set of products for a retailer. The application analyzes historical sales and product data contained in a database to (1) determine an opportunity score for multiple products sold by a retailer, the opportunity score indicating potential benefit to said business from changing the pricing of a product; and (2) determine an ability to change score for each product, the ability to change score indicating potential risk of lost sales for the retailer from changing the pricing of a product. Results of the analyses are displayed in a scatter plot graph with the graph axes being the opportunity scores and ability to change scores, respectively. Each product is represented by a point in the scatter plot, the coordinates of the point being the opportunity score and the ability to change score associated with the represented product. The scatter plot graph can be divided into quadrants, wherein products having favourable opportunity scores and favourable ability to change scores are displayed together in one the four quadrants. The application allows selection of products from the scatter plot, referred to as an opportunity matrix, for additional price optimization analysis.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for evaluating product pricing for a business enterprise, the steps comprising:
    a) establishing a database, implemented within a data warehouse, containing historical sales data for a plurality of products sold by said business enterprise;
    b) analyzing, by a computer in communication with said data warehouse, historical sales data contained in said database to determine an opportunity score for each one of said products, said opportunity score indicating potential benefit to said business from changing the pricing of a product;
    c) analyzing, by said computer, historical sales data contained in said database to determine an ability to change score for each one of said products, said ability to change score indicating potential risk of lost sales for said business from changing the pricing of a product; and
    d) displaying, on a display monitor in communication with said computer, a graph of said opportunity scores versus said ability to change scores for said plurality of products.

2. A computer-implemented method for evaluating product pricing for a business enterprise in accordance with claim 1, wherein:
    said graph comprises a scatter plot wherein each one of said plurality of products is represented by a point in said scatter plot, the coordinates of said point being the opportunity score and the ability to change score associated with the product represented by said point.

3. A computer-implemented method for evaluating product pricing for a business enterprise in accordance with claim 2, wherein:
    said scatter plot graph comprises four quadrants, wherein the products having favourable opportunity scores and favourable ability to change scores are displayed together in one of said four quadrants.

4. A system for evaluating product pricing for a business enterprise, comprising:
    a data warehouse;
    an electronic database, implemented within said data warehouse, containing historical sales data for a plurality of products sold by a retail enterprise; and
    a computer in communication with said data warehouse, said computer including a product pricing evaluation application for:
    analyzing historical sales data contained in said database to determine an opportunity score for each one of said products, said opportunity score indicating potential benefit to said business from changing the pricing of a product;
    analyzing historical sales data contained in said database to determine an ability to change score for each one of said products, said ability to change score indicating potential risk of lost sales for said business from changing the pricing of a product; and
    displaying, on a computer monitor in communication with said computer, a graph of said opportunity scores versus said ability to change scores for said plurality of products.

5. The system for evaluating product pricing for a business enterprise in accordance with claim 4, wherein:

said graph comprises a scatter plot wherein each one of said plurality of products is represented by a point in said scatter plot, the coordinates of said point being the opportunity score and the ability to change score associated with the product represented by said point.

6. The system for evaluating product pricing for a business enterprise in accordance with claim 5, wherein:

said scatter plot graph comprises four quadrants, wherein the products having favourable opportunity scores and favourable ability to change scores are displayed together in one of said four quadrants.

* * * * *